United States Patent
Singh et al.

(10) Patent No.: US 11,232,388 B2
(45) Date of Patent: Jan. 25, 2022

(54) AUTOMATED GUIDED VEHICLE SYSTEMS FOR RETRIEVING HEMS

(71) Applicant: Accenture Inc., Chicago, IL (US)

(72) Inventors: Paul Sundar Singh, Chennai (IN); Deepa Rajendran, Chennai (IN); Indira Boga, Visakhapatnam (IN); Bhargavi Parthasarathy, Chennai (IN); Swathi Kannan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/692,833

(22) Filed: Nov. 22, 2019

(65) Prior Publication Data

US 2021/0158270 A1    May 27, 2021

(51) Int. Cl.
*G06Q 10/08*    (2012.01)
*B65G 1/137*    (2006.01)
*B66F 9/06*    (2006.01)

(52) U.S. Cl.
CPC .......... *G06Q 10/08* (2013.01); *B65G 1/1373* (2013.01); *B66F 9/063* (2013.01)

(58) Field of Classification Search
None
See application file for complete search history.

(56) References Cited

U.S. PATENT DOCUMENTS

| | | | | |
|---|---|---|---|---|
| 5,002,145 A | * | 3/1991 | Wakaumi | B62D 1/28 180/168 |
| 5,023,790 A | * | 6/1991 | Luke, Jr. | G05D 1/0265 701/24 |
| 5,545,967 A | * | 8/1996 | Osborne | H02J 7/0027 320/109 |
| 5,995,844 A | * | 11/1999 | Fukuda | H04W 56/00 455/462 |
| 6,445,984 B1 | * | 9/2002 | Kellogg | B62D 1/28 318/587 |
| 8,909,368 B2 | * | 12/2014 | D'Andrea | B66F 9/063 700/214 |
| 9,874,308 B2 | * | 1/2018 | Saika | F16M 11/041 |
| 10,373,097 B2 | * | 8/2019 | Kulkarni | G08G 5/0034 |
| 10,613,533 B1 | * | 4/2020 | Payson | G06Q 10/087 |

(Continued)

*Primary Examiner* — Fateh M Obaid
(74) *Attorney, Agent, or Firm* — Norton Rose Fulbright US LLP

(57) ABSTRACT

Systems, method, and computer-readable storage media for controlling item retrieval processes from an item and storage infrastructure are disclosed. The disclosed techniques utilize an automated guided vehicle (AGV) and real-time feedback to validate the item retrieval process is performed correctly. Item retrieval may be performed autonomously by an AGV equipped with item retrieval components, such as hydraulic arms, pistons, and other components and control logic, or may be performed as a user-aided process, where feedback is provided to the user to instruct the user which item is to be retrieved and the user then loads the item onto the AGV. The AGV is configured to utilize a coordinate system to facilitate automated navigation along a series of determined waypoints during the item retrieval process. Additionally, feedback or instructions may be provided to a user device (e.g., for user-aided processes) to assist with the item retrieval process.

20 Claims, 10 Drawing Sheets

(56) References Cited

U.S. PATENT DOCUMENTS

| | | | |
|---|---|---|---|
| 2003/0028323 A1* | 2/2003 | Zeitler | G01S 5/14 |
| | | | 701/408 |
| 2014/0142757 A1* | 5/2014 | Ziegler | G06N 3/008 |
| | | | 700/255 |
| 2016/0327383 A1* | 11/2016 | Becker | G01B 11/005 |
| 2016/0352992 A1* | 12/2016 | Saika | H04N 5/2328 |
| 2018/0089619 A1* | 3/2018 | High | G07C 9/00571 |
| 2018/0141752 A1* | 5/2018 | Nakanishi | B66F 9/063 |
| 2020/0142401 A1* | 5/2020 | Ren | G05D 1/0238 |
| 2020/0249660 A1* | 8/2020 | Rao | G05B 19/41865 |
| 2020/0307667 A1* | 10/2020 | Tang | B62B 5/0069 |
| 2020/0326712 A1* | 10/2020 | Tang | G06K 9/00201 |
| 2020/0338763 A1* | 10/2020 | Tang | B66F 9/0755 |

\* cited by examiner

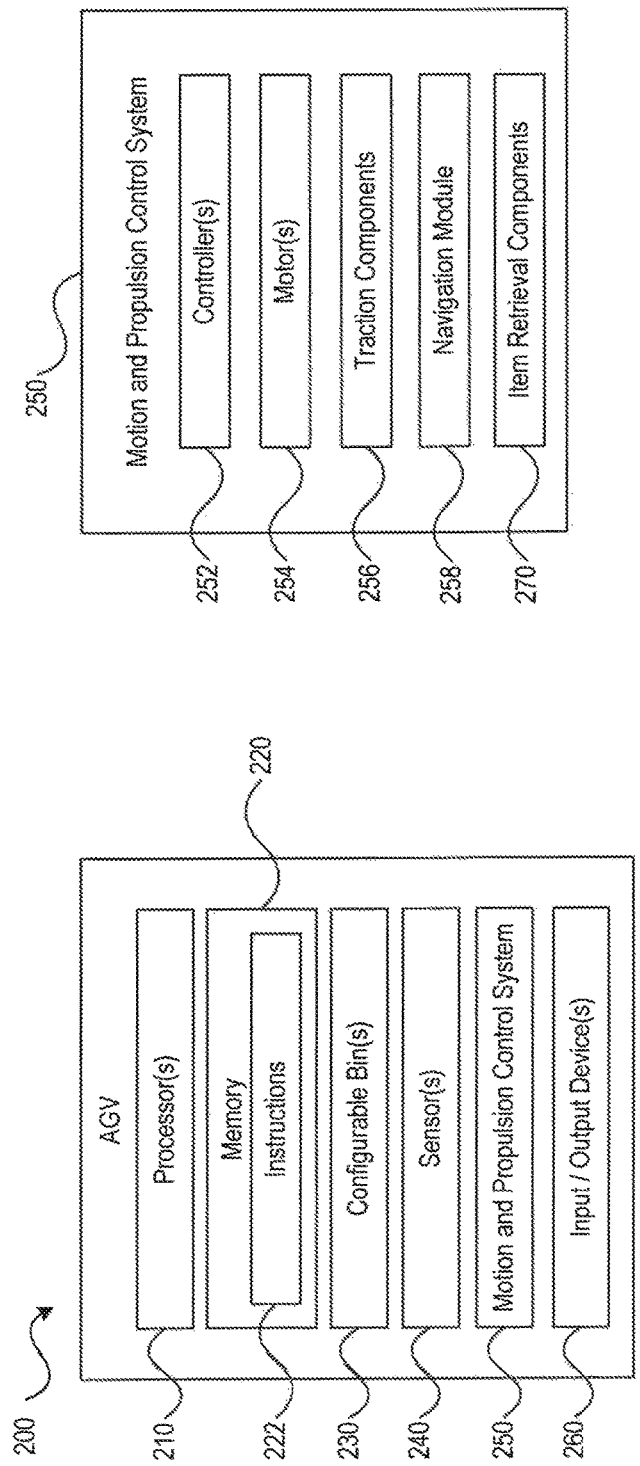
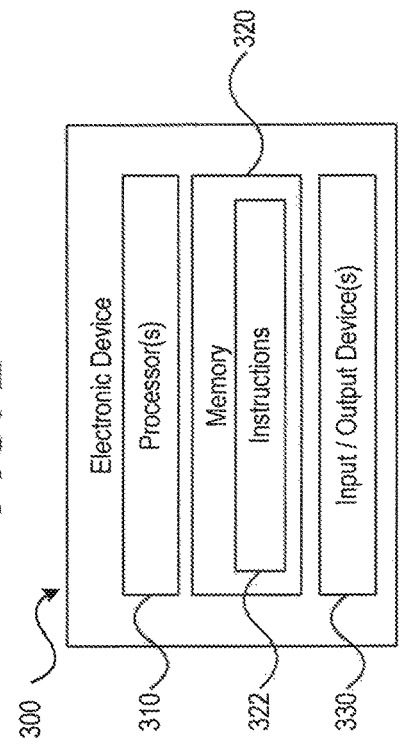
FIG. 2
FIG. 3

AUTOMATED GUIDED VEHICLE SYSTEMS FOR RETRIEVING ITEMS

TECHNICAL FIELD

The present application relates to industrial ergonomics and more specifically to systems utilizing autonomous vehicles and machine learning techniques to improve industrial processes.

BACKGROUND

Many types of industrial processes involve complex logistics problems that present challenges across a variety of systems and interfaces. For example, manufacturing processes often involve several different computing systems, such as an enterprise resource planning (ERP) system, facility and inventory management systems, user interface applications that facilitate user interaction with the ERP, facility, and inventory management systems, and the like. These different systems may become out of sync resulting in system information becoming inaccurate, such as having incorrect inventory levels indicated in an inventory database or other information discrepancies. When such errors occur, manufacturing processes may be delayed or canceled unnecessarily. For example, if inventory levels indicate that a particular item used in a manufacturing process is out of stock but there actually is sufficient stock on hand, additional quantities of the item may be ordered, and the manufacturing process may be scheduled for completion at a later time when the newly ordered item(s) will arrive. Such discrepancies also often require extraneous tasks to be performed, such as periodic inventory audits, where one or more individuals manually inspect inventory levels to verify the accuracy of records stored in the inventory database(s). Such audits are time consuming and inefficient, as production may need to be slowed in order to manually count current inventory for each item while the audit takes place.

SUMMARY

The present application is directed to techniques for improving manufacturing processes and infrastructure that support the manufacturing processes. In embodiments, an automated guided vehicle (AGV) is provided with capabilities to autonomously navigate item and storage infrastructure, such as a warehouse or other facility where items used in man till taming processes are stored, to retrieve items and deliver the items to a manufacturing/assembly area where the items are consumed by the manufacturing/assembly process. The AGV is configured to utilize a coordinate system calibrated to enable autonomous navigation of the AGV within the item and storage infrastructure to retrieve items needed by manufacturing processes and to travel from the item and storage infrastructure to a manufacturing/assembly area once an amount of items have been correctly retrieved and loaded onto the AGV. In some aspects, the items may be manually loaded on the AGV by a user while in other aspects the item retrieval process may be completely automated by an AGV having item retrieval components (e.g., mechanical anus, hydraulics, control elements, and the like) that enable the AGV to automatically retrieve items for delivery to the manufacturing/assembly area.

The AGVs may be supported by one or more servers or a cloud-based infrastructure that utilizes machine learning algorithms to select items and storage infrastructure and a particular AGV that are to be utilized to perform item retrieval in a timely manner such that items required by a manufacturing process are delivered at or near the time at which the manufacturing process is ready for the items. The AGVs and supporting systems are equipped with functionality to validate item retrieval is performed correctly and update inventory records at one or more databases to reflect current on-hand quantities as items are consumed by the manufacturing/assembly processes. Additionally, the supporting infrastructure (e.g., servers or cloud-based resources) may be configured to monitor the inventory database(s) and customer demand to automatically place orders for additional inventory so that on hand quantities of items are maintained at sufficient levels to ensure continuous operation of the manufacturing processes.

During user-aided item retrieval operations, the AGVs and supporting infrastructure may provide real-time feedback to users to indicate the items to be retrieved, as well as to indicate where retrieved items should be placed on the AGV. The real-time feedback is configured to minimize errors during item retrieval operations so as to minimize instances where incorrect items are delivered to the manufacturing/assembly processes. In addition to providing real-time feedback, the AGV or the AGV in connection with the supporting infrastructure may be configured to validate item retrieval based on sensor data provided by the AGV. Where the sensor data and validation processing indicate that an incorrect item has been retrieved, or that a correct item has been incorrectly loaded onto the AGV, additional feedback may be provided to the user. Feedback may also be provided to the user in the form of one or more interactive graphical user interfaces providing functionality that operate in coordination with the AGV and supporting infrastructure to guide the item retrieval process.

The foregoing has outlined rather broadly the features and technical advantages of the present invention in order that the detailed description of the invention that follows may be better understood. Additional features and advantages of the invention will be described hereinafter which faun the subject of the claims of the invention. It should be appreciated by those skilled in the art that the conception and specific embodiment disclosed may be readily utilized as a basis for modifying or designing, other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 2 is a block diagram of an AGV configured to facilitate item retrieval in accordance with embodiments of the present disclosure;

FIG. 3 is a block diagram of an electronic device providing functionality for retrieving items in accordance with embodiments of the present disclosure;

Figure 1:
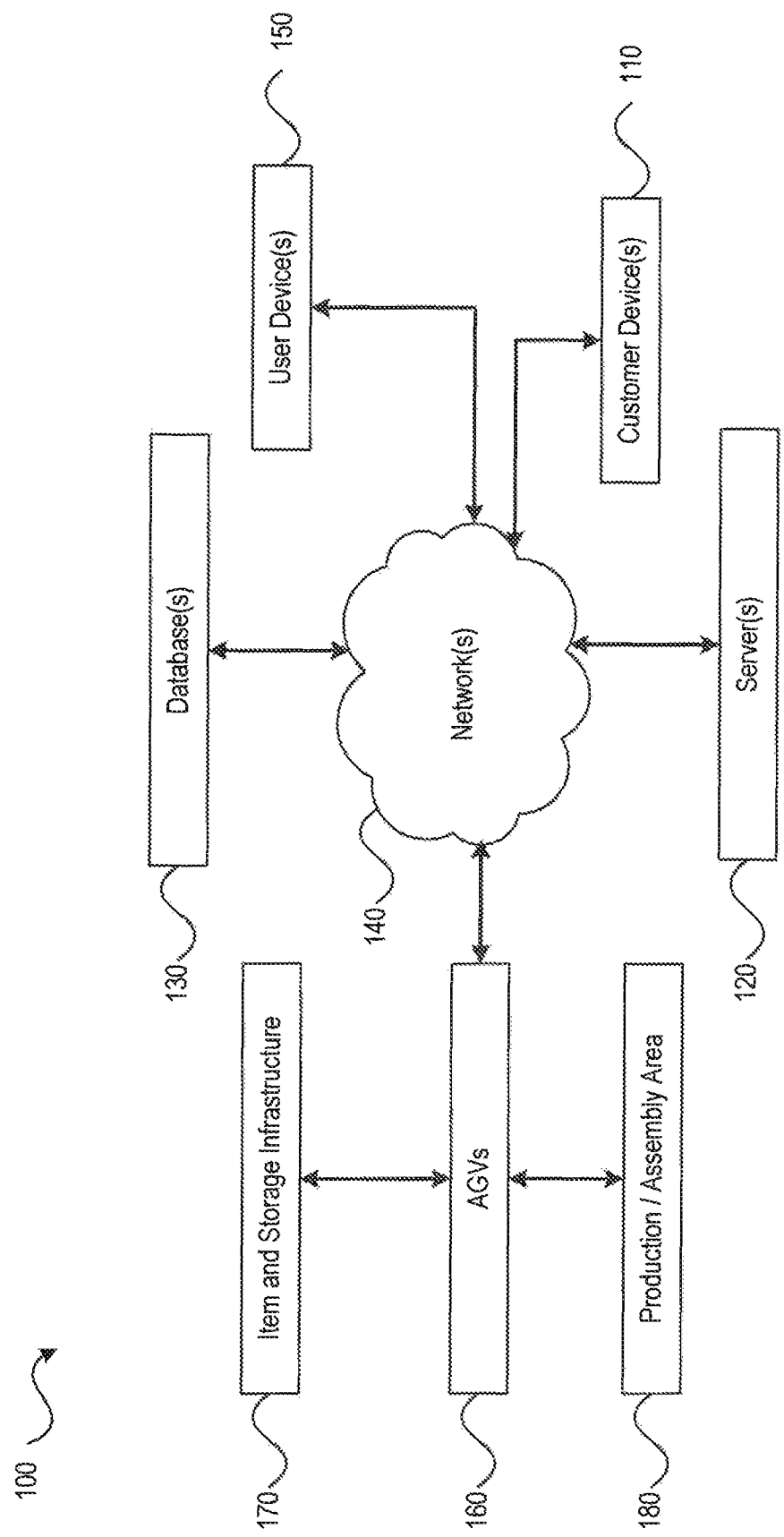
FIG. 1 is a block diagram of a system providing automated monitoring and control of manufacturing processes in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The systems and methods disclosed herein provide a digitalized supply chain integrated with ERP and other systems to achieve frictionless production capabilities that may be customized to various different industries. The solutions provided by the present disclosure Facilitate location, retrieval, and transport of items or materials from a dispatch area (e.g., a storage infrastructure facility or warehouse) to a destination location. The items or materials may be retrieved, transported, and delivered to the destination location for use in a production process, such as a manufacturing or assembly process configured to produce a product or a sub-component of a product using the delivered items or materials. The delivery of the items or materials may be timed such that the materials arrive to the destination location at or near the time at which the production process is ready to use the items or materials, thereby ensuring the production processes supported by the systems and methods of the disclosed embodiments may continue uninterrupted, which improves the overall efficiency of the manufacturing process and ensures production capacity of the manufacturing processes maintained or near a maximum level.

Retrieval, transport, and delivery of the items or materials may be facilitated, at least in part, by AGVs. As described in more detail below, the AGVs may include bin into which items or materials scheduled for retrieval and delivery may be placed and once a specified set of items or materials have been loaded into the bins the AGVs may navigate to the destination area to deliver the items or materials. The AGVs may utilize virtualized coordinate systems to navigate to items or materials of interest (e.g., items or materials scheduled for retrieval and delivery) and then to the destination location where the items or materials of interest are to be delivered items or materials stored in the storage infrastructure may be assigned coordinates within the virtual coordinate system and the AGV may travel to the items of interest via a route determined within the coordinate system using the coordinates of the items of interest. When the item or material retrieval process is performed in a human-assisted manner, the automatic navigation of the AGV to the items of interest may allow the items or materials to be retrieved more efficiently (e.g, the human assisting in the retrieval process will typically not be able to locate the items as quickly or plan optimum routes fir retrieving the items as compared to the routes determined by the AGV). Where the item or retrieval process is performed without human assistance, the retrieval process may be performed automatically and continuously (subject to battery or other power requirements of the AGV), thereby enabling the manufacturing processes to be carried out continuously and allowing the manufacturer to allocate more resources to the manufacturing process and less resources to item retrieval and delivery tasks. Additional advantageous aspects of the systems and methods disclosed herein will become apparent from the description that follows.

Referring to FIG. 1, a block diagram of a system providing automated monitoring and control of manufacturing processes in accordance with embodiments of the present disclosure is shown as a system 100. As shown in FIG. 1, the system 100 may include one or more customer devices 110, one or more servers 120, one or more databases 130, one or more user devices 150, one or more automated guided vehicles (AGVs) 160, item and storage infrastructure 170, and production/assembly area 180. Exemplary aspects of the one or more AGVs 160 are described in more detail below with reference to FIGS. 2 and 4-11. Aspects of the user devices 150 are described in more detail below with reference to FIGS. 3 and 11-12E. Each of the one or more servers 120 may include one or more processors, memory devices, communication interfaces, and other devices configured to facilitate the functionality described with reference to the exemplary servers disclosed herein, such as an ERP server, a warehouse or facility management server, an inventory management system, and the like. It is noted that functionalities described with reference to each of the different servers and system described herein is provided for purposes of illustration, rather than by way of limitation and that functionalities described as being provided by different servers may be combined into a single server or may be provided via computing resources disposed in a cloud-based environment accessible over a network, such as one of the one or more networks 140. Further, it is noted that although illustrated separately from the one or more servers 120, the one or more databases 130 may be stored at memory of a particular server or combination of servers in some embodiments.

The one or more networks 140 may communicatively couple different ones of the one or more customer devices 110, the one or more servers 120, the one or more databases 130, the one or more user devices 150, the one or more automated guided vehicles (AGVs) 160, the item and storage infrastructure 170, and the production/assembly areas 180 to each other. For example, the one or more networks 140 may communicatively couple the customer devices 110 to an ERP server (e.g., one of the one or more servers 120) that provides a customer-facing interface that enables customers of the system 100 to configure and place orders with the ERP server. Once an order is configured and received by the ERP server, the order may be processed by the ERP server and information may be distributed via the one or more networks 140 to one or more other servers, such as a warehouse facility server associated with the item and storage infrastructure 170 and the production/assembly area 180. The warehouse facility server may analyze the information received from the ERP server and generate messages that are then transmitted to one of user devices 150 and one of the AGVs 160. The information provided to the user device 150 and the AGV 160 may be configured to facilitate operations to retrieve items from the item and storage infrastructure 170 and deliver the items to the production/assembly area 180. The items delivered to the production/assembly area 180 may be utilized to complete a manufacturing or assembly process corresponding to the order received by the ERP server from the customer device 110. Exemplary aspects of the aforementioned processes are described in more detail below with reference to FIGS. 2-11.

As the items are retrieved, the user device 150 and the AGV 160 may communicate with the warehouse facility server or another server configured to manage inventory stored in the item storage infrastructure 170, such as to provide information regarding items retrieved from the item storage infrastructure 170 for consumption by the manufacturing, process performed upon delivery of the retrieved items to the production/assembly area 180, As the items are retrieved and delivered to the production/assembly area 180, the warehouse facility server or other server configured to manage inventory information may receive the information from the user device 150 and/or the AGV 160 and update a database (e.g., one of the databases 130 associated with inventory information corresponding to the item and storage infrastructure from which the item(s) is retrieved) to reflect that the retrieved items have been consumed by the manufacturing process, such as to reduce the available quantity of the retrieved item(s) in the inventory database. As described in more detail below, the user device 150 and the AGV 160 may include functionality and hardware configured to verify item retrieval operations and validate the item retrieval operations were completed correctly prior to changes in the inventory database being made. In an aspect, the ERP server or the warehouse facility management server may be configured to automatically order additional quantities of items based on current inventory levels, such as to order additional quantities of an item when current quantities on hand fall below a threshold level or when production forecasts (e.g., forecasts of future orders) suggest a spike in demand for particular items. These automated restocking processes may be configured to schedule delivery of the additional quantities of items prior to current supplies of the items becoming exhausted, which would halt production operations at the manufacturing/assembly area 180.

As will become apparent from the description that follows, the functionality provided by the system 100 provides several improvements to systems and processes utilized in manufacturing of products and/or sub-components of products. For example, the item retrieval validation functionality briefly described above ensures that inventory levels reflected in the inventory database(s) accurately reflect on-hand quantities of the items utilized in the manufacturing processes performed in the production/assembly area. Additionally, the AGVs of embodiments include functionality that enables rapid identification of particular items to be retrieved, such as automated navigation to the items required to process a received order, providing visual indications of the items to be retrieved and locations on the AGV where the retrieved items should be placed to ensure that the validation processes configured to verify item retrieval accuracy operate properly, and automated delivery of the retrieved items to the production/assembly area 180. Another advantage realized by the system 100 is the minimization of human labor to transport items. For example, the AGVs include bins into which retrieved items may be placed. As the items for one or more orders are retrieved, the items may be carried in the bins of the AGV (rather than by humans) and the AGV may automatically deliver the collected items to the production/assembly area once all items are collected and verified as correct. This eliminates the need to have humans transport the items by hand or by cart, reducing the costs associated with retrieving items from the item and storage infrastructure 170 and delivering the items to the production/assembly area 180.

Machine learning algorithms may also be employed by the servers 120 to select the particular item and storage infrastructure, AGV, and production/assembly area from which an order is to be fulfilled. As described in more detail below, the machine learning algorithms may be provided by a rules engine executing on one of the servers 120 (e.g., a warehouse facility management server). The machine learning algorithms may account for current capacity of the production/assembly areas 180, current quantities of items available at the different item storage infrastructures 170, and AGV availability and configurations to select a combination of these system features that can efficiently process a requested order. Additionally, rather than initiating item retrieval based on reception of a particular order, the ERP server may be configured to provide information regarding a forecasted demand for producing a particular product and items utilized to produce the particular product. Based on the forecasted demand, periodic retrieval of items may be scheduled to ensure that appropriate quantities of items are provided to the manufacturing/assembly areas to facilitate production of the products at levels that at least meet the forecasted demand. Such periodically scheduled item retrievals may be rapidly changed to account for changes in forecasted demand, such as to modify the scheduled item retrievals from a first set of items associated with manufacturing a first product to periodic retrievals of a second set of items associated with manufacturing a second product, which may occur based on changes to the real-time or forecasted demand for products. Additional advantages and improvements realized by the systems and techniques disclosed herein will be apparent from the description provided below with respect to FIGS. 2-14.

Referring to FIG. 2, a block diagram of an AGV configured to facilitate item retrieval in accordance with embodiments of the present disclosure is shown as an AGV 200. In an aspect, the AGV 200 may be part of a system (e.g., the AGV 160 of FIG. 1 and provide functionality for locating and transporting parts, materials, and the like in a production facility environment. As shown in FIG. 2, the AGV 200 may include one or more processors 210, a memory 220, configurable bin(s) infrastructure 230, one or more sensors 240, a motion and propulsion control system 250, and one or more input output devices 260. The one or more processors 210 may include one or more microcontrollers, application specific integrated circuits (ASIC), field programmable gate arrays (FPGAs), central processing units (CPUs) having one or more processing cores, or other circuitry and logic configured to facilitate the operations of the AGV 200 (and other AGV s described herein) in accordance with aspects of the present disclosure. The memory 220 may include RAM, ROM, EEPROM, HDDs, SSDs, flash memory devices, or other memory devices configured to Store instruction in a persistent or non-persistent state. Software configured to facilitate operations and functionality of the AGV 200 may be stored in the memory as instructions 222 that, when executed by the one or more processors 210, cause the one or more processors to perform the operations described herein with respect to the AGV 200, as described above with reference to the AGVs 160 of FIG. 1 and as described in more detail below. Although not illustrated in FIG. 2 for simplicity of the drawing, AGVs of embodiments may include a power source, such as one or more batteries, configured to provide operational power to the components of the AGV described herein.

Figure 8:
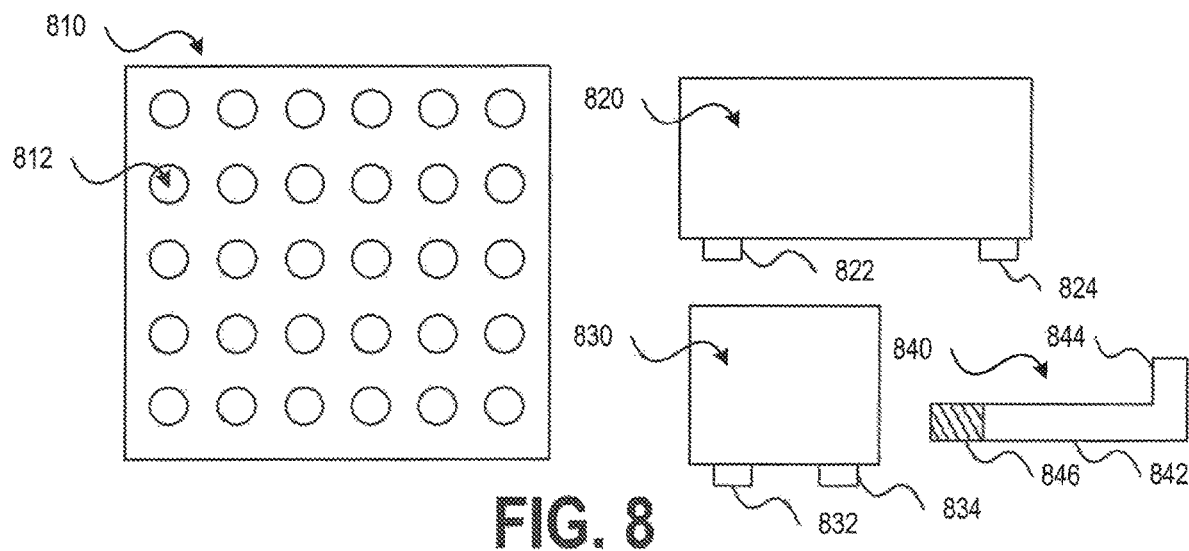
FIG. 8 is a block diagram illustrating aspects of configuring one or more bins of an AGV in accordance with embodiments of the present disclosure.

As briefly described above, the AGV 200 may include one or more bins 230 that are provided to receive items (e.g., parts and/or products) retrieved from a storage area and contain the items during transport to another area, such as a production or assembly facility where the items may be used as part of another process, such as a process to assemble a final product. The number of bins, as well as the size of the bins, that a particular AGV 200 includes may be configurable depending on the types of items for which the AGV 200 will be utilized. For example and referring briefly to FIG. 8, a block diagram illustrating aspects of configuring one or more bins of an AGV in accordance with embodiments of the present disclosure is shown. As shown in FIG. 8, AGVs of embodiments may include a bin interface 810 that may include a plurality of apertures 812. The apertures 812 may be configured to receive retaining members disposed on a surface (e.g., a bottom surface) of the bins. For example, as shown in FIG. 8, a first bin 820 may include retaining members 822, 824. The bin 820 may be removably coupled to the bin interface 810 by seating the retaining members 822, 824 within particular ones of the apertures 812 of the bin interface 810. As additionally shown in FIG. 8, a second bin 830, which may be smaller in at least one dimension (e.g., a length, width, and/or height) may include retaining member 832, 834 that may be removably coupled to the bin interface 810 by seating the retaining members 832, 834 within particular ones of the apertures 812 of the bin interface 810.

In an aspect, the retaining members 822, 824, 832, 834 may comprise posts that are sized and dimensioned to sit within the apertures 812 of the bin interface, such that once the retaining members 822, 824, 832, 834 are seated within the apertures 812, the bins 820, 830 are securely (e.g., the bins 820, 830 do not slide around as the AGV moves) held in place by the bin interface 810. In an additional or alternative aspect, the apertures 812 may be threaded and the retaining members may be embodied as screws or some other type of mechanism that is configured to threadably engage the apertures 812. Using a threaded engagement may ensure that the bins are secured to the bin interface and will not become dislodged (e.g., if the AGV is bumped or experiences some other for in of impact or turbulence). It is noted that the bins utilized by embodiments may include square bins, rectangular bins, circular bins, or some other shape of bin depending on the particular application(s) to which the bins may be utilized. Further, it is noted that AGVs of embodiments may include a bin interface disposed on the top surface of the AGV and/or one or more sides of the AGV, For example, a bin interface on the top of the AGV may be configured with one or more bins having a box-like shape, such as to house and store one or more items for transport. Additionally, it is noted that bins are not limited to box-like shapes. To illustrate, a bin interface on a side of the AGV may include one or more bins 840 having arms 842 and hooks or retaining bars 844 designed to hold elongated items (e.g., poles, rods, or other longer items). Further, it is to be understood that bins utilized in connection with AGVs in accordance with the present disclosure may have other form factors, sizes, and shapes depending, on the particular items to be loaded on or within the bins. It is noted that when bins are utilized with a bin interface disposed on a side of the AGV, utilizing threaded retaining members 846 may ensure that the bins do not become dislodged or separated from the bin interface of the AGV is noted that the concepts described above with respect to the bin interface 810 and the retaining members of the bins have been provided for purposes of illustration, rather than by way of limitation and that other types of mechanisms may be utilized to secure bins to the bin interfaces of AGVs in accordance with aspects of the present disclosure. Further, it is noted that the ability to removably couple the bins to the AGVs may enable different AGVs to be configured with different types of bins, which may allow AGVs to be configured to transport more or less items depending on the particular tasks to be completed.

Referring back to FIG. 2, the one or more sensors 240 of the AGV 200 may include weight sensors, pressure sensors, accelerometers, gyroscopes, proximity sensors, or other sensors configured to provide information to the AGV 200 regarding its operation and operating environment. The weight sensor(s) or pressure sensor(s) may be utilized to determine whether one or more items have been placed into the bins of the AGV 200, as described in more detail below. The accelerometers, gyroscopes, and proximity sensors may provide sensor data to the motion and propulsion control system 250, which may use at least a portion of the sensor data to control navigation and movement of the AGV 200, as described in more detail below. For example, during, navigation of the AGV 200 sensor data provided by the proximity sensors may be utilized to detect obstacles in the path of travel of the AGV 200. When an obstacle is encountered and detected by the AGV 200, the navigation module may reroute the AGV 200 around the obstacle or the input/output (I/O) devices 260 may generate an alert, such as a beep or other sound, or flash one or more lights to indicate an obstacle has been encountered and needs to be removed from the path of the AGV 200.

The I/O devices 260 of the AGV 200 may include communication interfaces (e.g., network communication interfaces, universal serial bus (USB) interfaces, Bluetooth communication interfaces, and the like) configured to communicatively couple the AGV 200 to local devices (e.g., via the USB interface, etc.) and remote devices (e.g., via the network communication interfaces, Bluetooth communication interfaces, etc.). Such communication capabilities may enable bidirectional communication between the AGV and one or more local and external devices during operation of the AGV 200. For example, as briefly described above, during operation of the AGV 200 items may be placed into the bin(s) of the AGV 200. As items are detected as being placed within the bin(s) (e.g., based on the sensor data, provided by the weight and/or pressure sensors) the AGV 200 may communicate with a user device (e.g., one of the user devices 150 of FIG. 1) to confirm the part has been placed in the (correct) bin. Such communication may be facilitated by a wireless communication link (e.g, a Bluetooth communication link, a Wireless Fidelity (Wi-Fi) communication link, and the like) established between the AGV 200 and the user device. The communication links utilized by the AGV 200 may also be configured to communicatively couple the AGV 200 to one or more remote servers, such as one or more of the servers 120 described above with reference to FIG. 1, and the one or more databases 130 of FIG. 1. For example, as items are placed into the bin(s), the AGV 200 may be configured to communicate information to one of the databases 130 of FIG. 1. (e.g., an item or inventory database) to indicate that one or more items of inventory have been consumed (e.g., taken from inventory for use in a manufacturing or assembly process). Alternatively, the AGV 200 may communicate information to a server and the server may update the database(s) 130. The AGV 200 may also transmit information to one of the servers 120 (e.g., a production or warehouse server) to indicate that items for a particular order have been retrieved and will soon be delivered to a manufacturing/assembly area. Additionally or alternatively the user devices (e.g., the user devices 150 of FIG. 1) may provide the information to the database to indicate that one or more items of inventory have been consumed. Transmission of such information by the user device(s) may, in some aspects, be initiated upon receiving confirmation that the item has been placed into the bin, from the AGV (e.g., a confirmation transmitted by the AGV 200 based on the sensor data received from the weight and/or pressure sensor (s)). It is noted that the weight of the items may be used to track a number of items that have been placed into the bins. For example, suppose an item weights 1 pound and a total of 4 units of the item are to be retrieval. The weight information may be monitored by the AGV 200 to determine when 4 items have been placed into the bin, such as when the weight information indicates that 4 pounds have been detected as being placed in the bin. If the AGV 200 detects a discrepancy, such, as the weight of the items placed in the bin reading 2.6 pounds, the AGV 200 may determine that an incorrect item has been placed in the bin and may generate an alert. Thus, the AGV 200 may be configured to track information associated with whether the correct items are placed into the correct bins based on weight information. Validating the accuracy of the items placed in each bin may ensure that the correct items are delivered to the production/ assembly area in the correct quantities so that production processes do not become delayed due to insufficient or incorrect delivery of items. Further, the ability to track the accuracy of items placed into the bins in real-time using weight information ensures that any errors are caught quickly and corrected.

The I/O devices 260 may also include one or more optical devices, such as light emitting diodes (LEDs) or other light sources, lasers, cameras, and the like. The light sources or LEDs may be disposed proximate to the one or more bins or even disposed on the bins. Where the light source(s) is disposed on a bin, one of the retaining members of the bin may be configured to provide an electrical connection in addition to securing the bin to the bin interface. For example, when the retaining member making the electrical connection is interfaced with the bin interface, the aperture receiving the retaining member may dispose proximate circuitry or electrical connection logic that is configured to selectively provide power to the light source of the bin. The light source(s) associated with a particular bin may be configured to light up to identify into which bin an item should be placed, as described in more detail below. In an aspect, lasers may be provided to highlight or identify particular items within a warehouse or other area where the items are stored prior to retrieving the items utilizing the AGV 200. When provided, the laser(s) may be pivotably mounted on the AGV 200. The one or more processors 210 of the AGV 200 may be configured control the direction or orientation, of the laser(s) so that the correct item (e.g., the next item to be received in one of the bins 230) is identified for retrieval, such as to point the laser at a location of a next item to be retrieved, as described in more detail with reference to FIG. 9. For example, as described below, the AGV 200 may receive information that identifies one or more items that are to be retrieved. This information may be analyzed and locations associated with each item within a warehouse may be identified. Once the known locations of the items are determined, the motion and propulsion control system 250 may be configured to control movement of the AGV 200 to the appropriate locations where the items may be retrieved and placed within the correct ones of the bins 230.

As further illustrated in FIG. 2, the motion and propulsion control system 250 may include one or more controllers 252, one or more motors 254, traction components 256, and a navigation module 258. The one or more controllers 252 may be configured to control operations of the one or more motors 254 and the traction components 256 to navigate the AGV 200 from a first location to a second location (e.g., a starting location to a first item location, from a previous item location to a next item location, or from a last item location to an item drop off point). The traction components 256 may include wheels, belts or treads, or other components configured to allow the AGV 200 to traverse a distance based on driving forces provided by the one or more motors 254. In an aspect, the one or more motors 254 driving the traction components 256 may include one or more stepper motors configured to drive the traction components 256 in discrete increments. Utilizing stepper motors configured to drive the traction components 256 in discrete increments may provide advantages over other types of motor drive systems. For example, as explained herein, the AGV 200 may be configured to autonomously navigate from a starting location to one or more remote locations to retrieve items (e.g. from a warehouse or storage facility) and then to a destination location, such as a location where the items may be unloaded form the AGV 200 for further processing. To facilitate such navigation, the warehouse and other destinations through which the AGV 200 may navigate may be mapped to a coordinate system, which may include a 2 dimensional coordinate system or a 3 dimensional coordinate system, as described in more detail below with reference to FIGS. 4-6 and FIG. 9. As the stepper motors are driven, each step of the stepper motors may move the AGV 200 one discrete unit of distance.

The discrete unit of distance may be applied to the coordinate system to determine a distance traveled by the AGV 200 within the coordinate system. In an aspect, the coordinate system may be directly scaled to the discrete units of distance traveled by each step and each discrete unit of distance traveled in a first direction (e.g., an "X" direction) may represent 1 unit of distance traveled in the first direction. To illustrate, starting from a first location (e.g., 0, 0) and driving the stepper motor 3 discrete steps may cause the AGV 200 to travel 3 units of distance in the first direction (e.g., after the 3 discrete steps the AGV 200 is located at (3, 0)) and 8 more discrete steps in the first direction by the stepper motor cause the AGV 200 to travel 8 units of distance in the first direction (e.g., after the 8 more discrete steps the AGV 200 is located at (11, 0)). In an additional or alternative aspect, the coordinate system may be scaled to a number of discrete units of distance traveled by each step such that a particular number of discrete units of distance traveled in a first direction (e.g, an "X" direction) represents 1 unit of distance traveled in the first direction within the coordinate system. To illustrate, starting from a first location (e.g., 0, 0) and assuming 10 discrete steps represents 1 unit of distance traveled in the coordinate system, if the stepper motor is driven 3 discrete steps the AGV 200 may travel 0.3 units of distance in the first direction (e.g., after the 3 discrete steps the AGV 200 is located at (0.3, 0)) and traveling 8 more discrete steps in the first direction causes the AGV 200 to travel 0.8 additional units of distance in the first direction (e.g., after the 8 more discrete steps the AGV is located at (1.1, 0)). In an aspect, the discrete steps may correspond to a rotation of 0.8° (e.g., if the traction component is a wheel, each step of the stepper motor rotates the wheel) 0.8°. The size of the wheel (e.g., circumference, radius, diameter, etc.) and the degree of rotation (e.g., 0.8° in this example) may be utilized to calculate the distance traveled by each discrete step (e.g., each 8 rotation of the wheel) and may be used to track the distance traveled by the AGV in the coordinate system, as described above.

While the description above illustrates tracking linear movement (e.g., in a single direction) of the AGV 200 within the coordinate system, the navigation module 258 may also be configured to track movement and navigation of the AGV 200 in two dimensions (e.g., an X direction and a Z direction) and along combinations of directions in two dimensions simultaneously. The AGV 200 may be configured to steer using a center wheel drive and pivoting mechanism that provides the AGV 200 with 360° of turning radius. In an aspect, the AGV 200 may be steered or turned using differential speed control. To illustrate, two motors may be provided and driven at varying speeds and the speed of each motor and their direction of rotation may determine whether the AGV 200 moves forward (e.g., both motors being driven at the same speed and in a first direction), backward (e.g., both motors being driven at the same speed and in a second direction—a direction opposite the first direction), or turn left or right (e.g., both motors being driven at the different speeds in particular directions). It is noted that steering via differential speed control may also provide a smaller diameter turn radius, which may minimize drift daring turning. It is to be understood that the exemplary techniques for tracking the distance traveled by the AGV 200 within a coordinate system described above have been provided for purposes of illustration rather than by way of limitation and that systems and AGVs according to the present disclosure may utilize other techniques for tracking movement and navigation of an AGVs in accordance with the concepts disclosed herein. For example, additional techniques for controlling navigation of AGVs and tracking of the location of AGVs are described and illustrated below with reference to FIG. 6.

To facilitate consistent autonomous navigation of the AGV 200, the navigation module 258 may be configured to store information associated with the coordinate system, such as information that maps particular locations within the coordinate system to points of interest (e.g., a docking station where the AGV 200 may return when not in use to recharge, be reconfigured with different bins, coordinates of item destinations, etc.), Additionally, the navigation module 258 may be configured to store information associated with items stored in the storage facility and location information associated with destinations where the AGV 200 may unload items. The navigation module 258 may also be configured to dynamically determine locations within the coordinate system via communication with one or more remote devices, such as one or more remote servers (e.g., one or more of the servers 120 of FIG. 1) or remote sensors, Additional operations and aspects of AGVs according to the present disclosure are described in more detail below with reference to FIGS. 4-6 and FIG. 9, After a delivery of items to the appropriate manufacturing/assembly area occurs, the AGV 200 may return to its docking bay (e.g., to recharge its batteries) if there are no more scheduled items to retrieve.

In an aspect, each time the AGV returns to the docking bay it may recalibrate the navigation system with respect to the current location of the AGV, For example, as described above, each docking bay may have a defined coordinate location within the coordinate system used for navigation by the AGV. Although the discrete units of distance may minimize drift with respect to navigation of the AGV within the coordinate system, inconsistencies may build up over time resulting in slight discrepancies between the location calculated based on the number of steps and direction of travel of the AGV and the actual location within the coordinate system that the AGV currently occupies. Recalibrating the location of the AGV as it periodically returns to the docking bay may minimize the impact that such drift has on the navigation system and refresh the navigation system accuracy dynamically. For example, the one or more batteries of the AGV may have a theoretical runtime of approximately 10 hours, hut actual runtimes may be in the range of 5 to 7 hours during operation due to losses associated with heat, load, friction, and the like. It is noted that the exemplary operations described above to minimize drift of the navigation system by periodically recalibrating the location of the AGV to a known location within the coordinate system (e.g., the coordinates of the AGV's docking bay) has been provided for purposes of illustration, rather than by way of limitation and that other techniques for mitigating the effects of drift may also be utilized by the AGVs of embodiments.

In some embodiments, rather than relying on a user to retrieve the item and place the item in the appropriate bin of the AGV 200, the AGV 200 may be configured with item retrieval components 270. The item retrieval components 270 may include robotic arms, movement control components (e.g., servos, gears, etc.), hydraulics (e.g., to drive the movement control components and control movement of the robotic am), and control logic configured to determine one or more movements of the robotic arm to place it in proximity to an item to be retrieved and to control activation of the movement control components and the hydraulics to execute the determined one or more movements. Additionally, once an item has been retrieved, the control logic may determine one or more movements of the robotic arm and associated control components to cause the robotic arm to place the retrieved item into the appropriate bin of the AGV 200. In embodiments where item retrieval components 270 are provided, AGVs may be enabled to operate in a near-continuous manner without human intervention, enabling more resources to be dedicated to the manufacturing of products (e.g., due to requiring less resources to retrieve the items used in the manufacturing process). It is noted that the item retrieval components described above have been provided for purposes of illustration, rather than by way of limitation, and that other types of components and drive mechanisms may be utilized to facilitate automatic retrieval of items by AGVs in accordance with the concepts disclosed herein.

Referring to FIG. 3, a block diagram of an electronic device providing functionality for retrieving items in accordance with embodiments of the present disclosure is shown as an electronic device 300, In an aspect, the electronic device 300 may be a tablet computing device, a laptop computing device, a smartphone, a personal digital assistant (PDA), or another type of electronic device configured to perform the operations of the user device 300 (and the user device(s) 150 of FIG. 1) described herein. As shown in FIG. 3, the electronic device 300 includes one or more processors 310, a memory 320, and I/O devices 330. The one or more processors 310 may include one or more microcontrollers, application specific integrated circuits (ASIC), field programmable gate arrays (FPGAs), central processing units (CPUs) having one or more processing cores, or other circuitry and logic configured to facilitate the operations of the user device 300 (and other user devices described herein) in accordance with aspects of the present disclosure. The memory 320 may include RAM, ROM, EEPROM, HDDs, SSDs, flash memory devices, or other memory devices configured to store instruction in a persistent or non-persistent State, Software configured to facilitate operations and functionality of the electronic device 300 may be stored in the memory 320 as instructions 322 that, when executed by the one or more processors 310, cause the one or more processors to perform the operations described herein with respect to the user device 300 and the user devices 150 of FIG. 1. Additionally, functionality provided by user devices of embodiments is described in more detail below with reference to FIGS. 11 and 12.

The I/O devices 330 of the electronic device 300 may include a display screen or device configured to display information to a user. The I/O devices 330 may also include one or more input devices for receiving information from a user, using for example, haptic-based input, voice-based input, movement-based input, vision-tracking input, and the like Exemplary I/O devices for providing such input capabilities may include a touchpad, a keyboard, a mouse, a stylus, a touch screen interface facilitating user inputs via a user touching the display screen at particular locations (e.g., locations where one or more icons configured to solicit particular inputs from the user are located), or other devices. The I/O devices 330 of the electronic device 300 may also include communication interfaces (e.g., network communication interfaces, universal serial bus (USB) interfaces, Bluetooth communication interfaces, and the like) configured to communicatively couple the electronic device 300 to local devices (e.g., via the USB interface, etc.) and remote devices (e.g., via the network communication interfaces, Bluetooth communication interfaces.

Figure 12A:
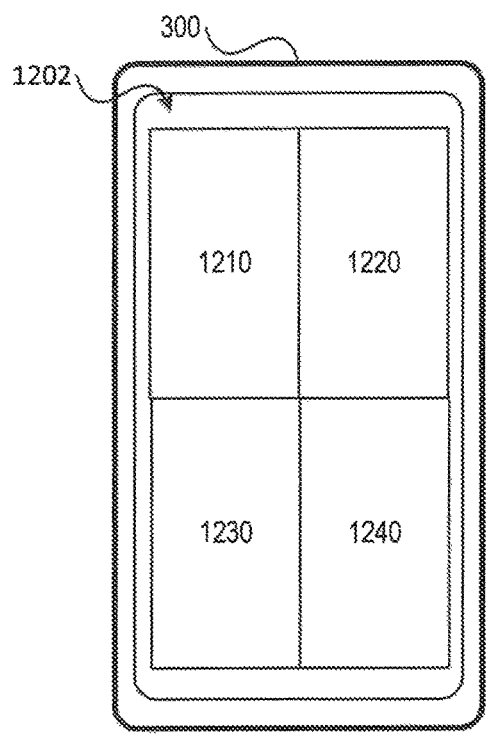
FIG. 12A is a block diagram illustrating aspects of providing information associated with items to be retrieved using a graphical user interface in accordance with the present disclosure.
Figure 12B:
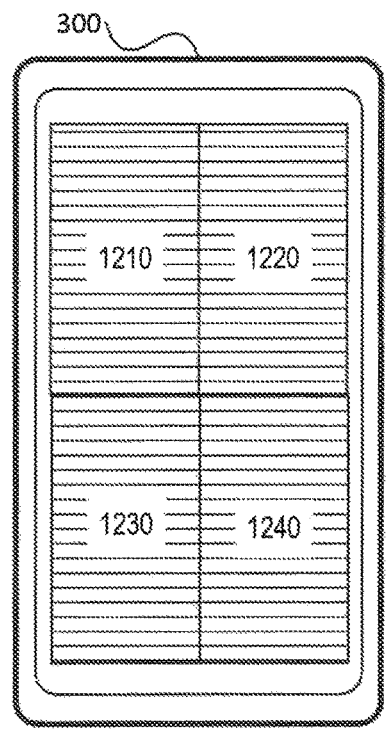
FIG. 12B is a block diagram illustrating aspects of providing information associated with items to be retrieved using a graphical user interface in accordance with the present disclosure.
Figure 12C:
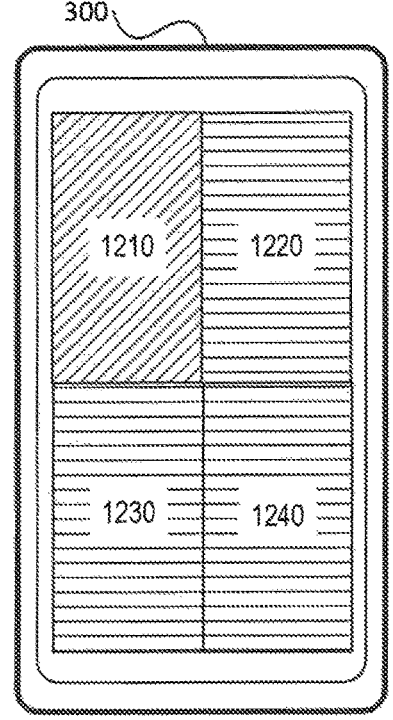
FIG. 12C is a block diagram illustrating aspects of providing information associated with items to be retrieved using a graphical user interface in accordance with the present disclosure.
Figure 12D:
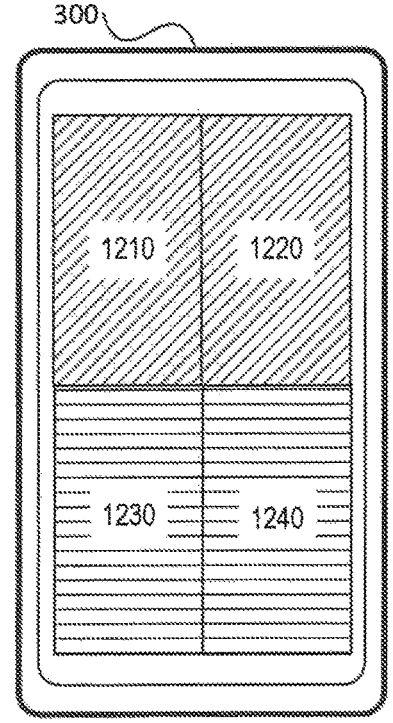
FIG. 12D is a block diagram illustrating aspects of providing information associated with items to be retrieved using a graphical user interface in accordance with the present disclosure.
Figure 12E:
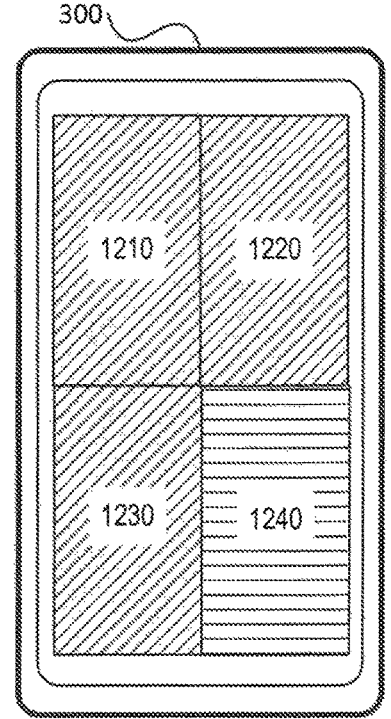
FIG. 12E is a block diagram illustrating aspects of providing information associated with items to be retrieved using a graphical user interface in accordance with the present disclosure.

The communication capabilities provided by the communication interface(s) may enable bidirectional communication between the electronic device 300 and one or more local and external devices during operations to retrieve items. For example, as briefly described above, during retrieval of items information may be presented at the electronic device 300 to identify a particular item that is to be retrieved and placed into the bin(s) of an AGV (e.g., the AGV 200 of FIG. 2). To illustrate and referring to FIGS. 12A-12E, various block diagrams illustrating aspects of providing information associated with items to be retrieved in accordance with the present disclosure are shown. In the examples illustrated in FIGS. 12A-12E, the electronic device 300 of FIG. 3 is shown displaying information on a display screen 1202. For example, in FIG. 12A, the display screen 1202 is shown displaying information associated with four items to be retrieved, where the items are noted as items 1210, 1220, 1230, 1240. Initially, the display screen may display each of the items 1210, 1220, 1230, 1240 in a first color, denoted by the shading illustrated in FIG. 12B. The first color may indicate which items have yet to be retrieved. Upon retrieving the item 1210, the display region associated with the item 1210 may be updated from the first color to the second color, as shown in FIG. 120. Subsequent to retrieving the first item 1210, the item 1220 may be retrieved and the display region corresponding to item 1220 may be updated to the second color, as shown in FIG. 12D. As the item 1230 is retrieved the display region corresponding to item 1230 may be updated to the second color, as shown in FIG. 12E. This process may continue until all items are retrieved. In an aspect, more than two colors may be utilized to indicate a status of the item retrieval process. For example, the first color (e.g., red) may be used to indicate a task for retrieving one or more associated items is incomplete, the second color (e.g., green) may be used to indicate the task for retrieving one or more associated items is complete, and a third color may be used to indicate the task is partially complete, such as to indicate that at least some of the items have been retrieved correctly but that the retrieval task is incomplete (e.g., the quantity of items retrieved is less than a total quantity of items to be retrieved, etc.). It is noted that the exemplary color schemes described above have been provided for purposes of illustration, rather than by way of limitation and that other color schemes may be utilized to provide feedback to the user during retrieval of items depending on the particular configuration of the system and interface.

In an aspect, one or more icons or other firms of interactive elements may be presented in the different display regions associated with each of the items 1210, 1220, 1230, 1240 during retrieval of items. For example, an icon requesting the user of the electronic device 300 to confirm the item being currently retrieved has been placed in the bin of the AGV may be provided. The user may interact with (e.g., select or click) the icon to confirm that the item has been placed in the bin. Upon receiving the input indicating the item has been placed in the bin, information may be transmitted from the electronic device 300 to a remote device, such as one of the servers 130 of FIG. 1. The server (e.g., a warehouse server or some other server configured to track progress of item retrieval processes and inventor may use the information transmitted from the electronic device 300 to update an inventory database to indicate quantities on hand (e.g., after removal of the one or more items retrieved by the user). In an aspect, the inventory database may be updated after receiving the information from the electronic device 300 and confirmation of the item(s) being received in the bin(s) from the AGV. Utilizing information received from both the electronic device 300 and the AGV may improve the accuracy of the inventory database by preventing updates of the database if the user retrieves the incorrect item or places the item in the incorrect bin. As described elsewhere herein, the AGV may be configured with functionality to verify that a retrieved item has been placed in the correct bin, and the information transmitted by the AGV may only be transmitted if the item is placed in the correct bin or may indicate that the incorrect item has been retrieved, which may prevent the inventor database from being updated until the defect is corrected (e.g., the item is placed in the correct bin or the correct item is placed in the bin).

In addition to providing interactive elements or icons configured to receiving inputs confirming an indicated item has been placed into a bin(s) of the AGV, the display regions corresponding to each item may also be configured to display an image of the item, which may enable the user to visually confirm the retrieved item is correct by comparing the item to the image displayed on the display screen 1202. It is noted that other information may also be displayed, such as a quantity of the item to be retrieved, a name of the item, a part number of the item, and the like. Additionally, the display screen 1202 may present information associated with a particular bin into which the retrieved item is to be placed. For example, a graphic or icon may be presented that illustrates the bin configuration of the associated AGV and the bin into which the item is to be placed may be highlighted or otherwise identified to the user. The graphical user interface(s) provided by the electronic device 300 may also include information that indicates a number of items to be retrieved (e.g. retrieve 2 of a first item, 1 of a second item, 5 of a third item, and the like).

Additionally or alternatively, the storage bins from which the items are retrieved may have a display (e.g., a liquid crystal display, a seven segment display, etc.) configured to display the number of items to be retrieved. Such display devices may be communicatively coupled to one or more servers (e.g., the one or more server 120 of FIG. 1) and/or the AGV 200 and the quantity displayed at the display of the storage bin may be controlled based on information provided by the server(s) or the AGV 200. For example, the AGV 200 may provide information to a server that indicates the AGV 200 is at a particular waypoint corresponding to an item to be retrieved and the server may transmit information to the storage bin corresponding to the item to control activation of the LED associated with the storage bin and to cause the display associated with the storage bin to display the quantity of items to be retrieved from the storage bin and loaded onto the AGV. Alternatively, the AGV 200 may transmit the information for activating the LED and siaplying the quantity on the display directly to the storage bin.

In an aspect, the storage bins may be configured with a pressure or weight sensor configured to detect each time an item is removed from the storage bin and the display of the quantity may be updated (e.g., deer merited) each time an item is removed. In an aspect, one or more of the servers (e.g., the one or more servers 120 of FIG. 1) may be configured to monitor the quantities of items held in each of the storage bins based on the weight information provided by the pressure or weight sensor and may automatically order additional quantities of items when the weight information indicates on-hand quantities have fallen below a threshold level. The determination to order additional quantities of items may also be based, at least in part, on forecasted demand for the items. For example threshold triggering automatic orders of items (e.g., to replenish available inventory) may be periodically updated based on forecasted future demand for products manufactured from the items. As forecasted demand increases the threshold(s) may be raised to ensure that sufficient quantities remain on hand and avoid situations where shortages occur (e.g., production processes would not be delayed if a delivery of items is late) and as forecasted demand decreases the threshold(s) may be decreased to avoid carrying excess inventory. It is noted that the exemplary functionality and components described above with reference to the electronic device 300 and the displays associated with the storage bins have been provided for purposes of illustration, rather than by way of limitation and that additional functionality and features may be provided by electronic devices configured according to aspects of the present disclosure.

Figure 4:
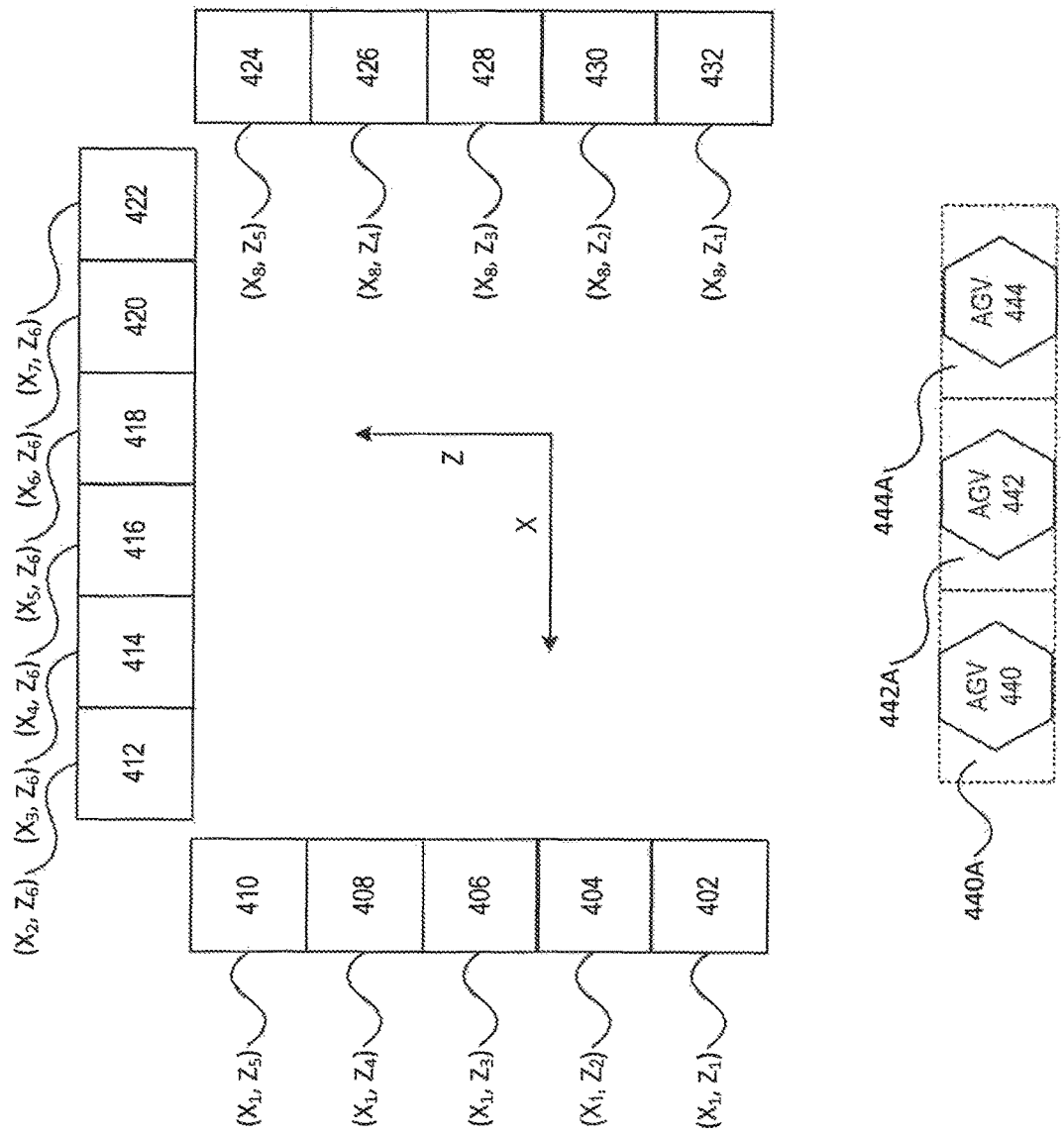
FIG. 4 is a block diagram illustrating aspects of AGV operations for retrieving items in accordance with embodiments of the present disclosure.

Referring to FIG. 4, a block diagram illustrating aspects of AGV operations for retrieving items in accordance with embodiments of the present disclosure is shown. In an aspect, the environment illustrated in FIG. 4 may correspond to a warehouse or other type of facility where items are stored for later use in other processes, such as manufacturing and assembly processes where retrieved items are combined for final components, products, sub-components, and the like. As shown in FIG. 4, a plurality of items 402-432 may be arranged in rows and/or columns within a facility. To facilitate identification of specific items of the plurality of items 402-432, each item may be associated with a specific location within a coordinate system, such as the coordinate system(s) described above with reference to FIG. 2. For example, item 402 may be associated with coordinates ($X_1$, $Z_1$), item 404 may be associated with coordinates ($X_1$, $Z_2$), item 406 may be associated with coordinates ($X_1$, $Z_3$), item 408 may be associated with coordinates ($X_1$, $Z_4$), item 410 may be associated with coordinates ($X_1$, $Z_5$), item 412 may be associated with coordinates ($X_2$, $Z_5$), item 414 may be associated with coordinates ($X_3$, $Z_6$), item 416 may be associated with coordinates ($X_4$, $Z_6$), item 418 may be associated with coordinates ($X_5$, $Z_6$), item 420 may be associated with coordinates ($X_6$, $Z_6$), item 422 may be associated with coordinates ($X_7$, $Z_6$), item 424 may be associated with coordinates ($X_8$, $Z_5$), item 426 may be associated with coordinates ($X_8$, $Z_4$), item 428 may be associated with coordinates ($X_8$, $Z_3$), item 430 may be associated with coordinates ($X_8$, $Z_2$), and item 432 may be associated with coordinates ($X_8$, $Z_1$). The coordinates associated with each of the plurality of items 402-432 may be stored in a database (e.g., one of the databases 130 of FIG. 1 and/or a database of the AGV, such as a database of the navigation module).

In addition to assigning coordinates to the locations associated with items, coordinates may be associated with one or more docking stations where AGVs of embodiments may be stationed when not retrieving items. For example, in FIG. 4, docking stations 440A, 442A, 444A are illustrated. Docking station 440A may be associated with AGV 440, docking station 442A may be associated with AGV 442, and docking station 444A may be associated with AGV 444. The docking, stations 440A, 442A, 444A may include infrastructure facilitating recharging of the one or more batteries of the corresponding AGVs 440, 442, 444.

Figure 5:
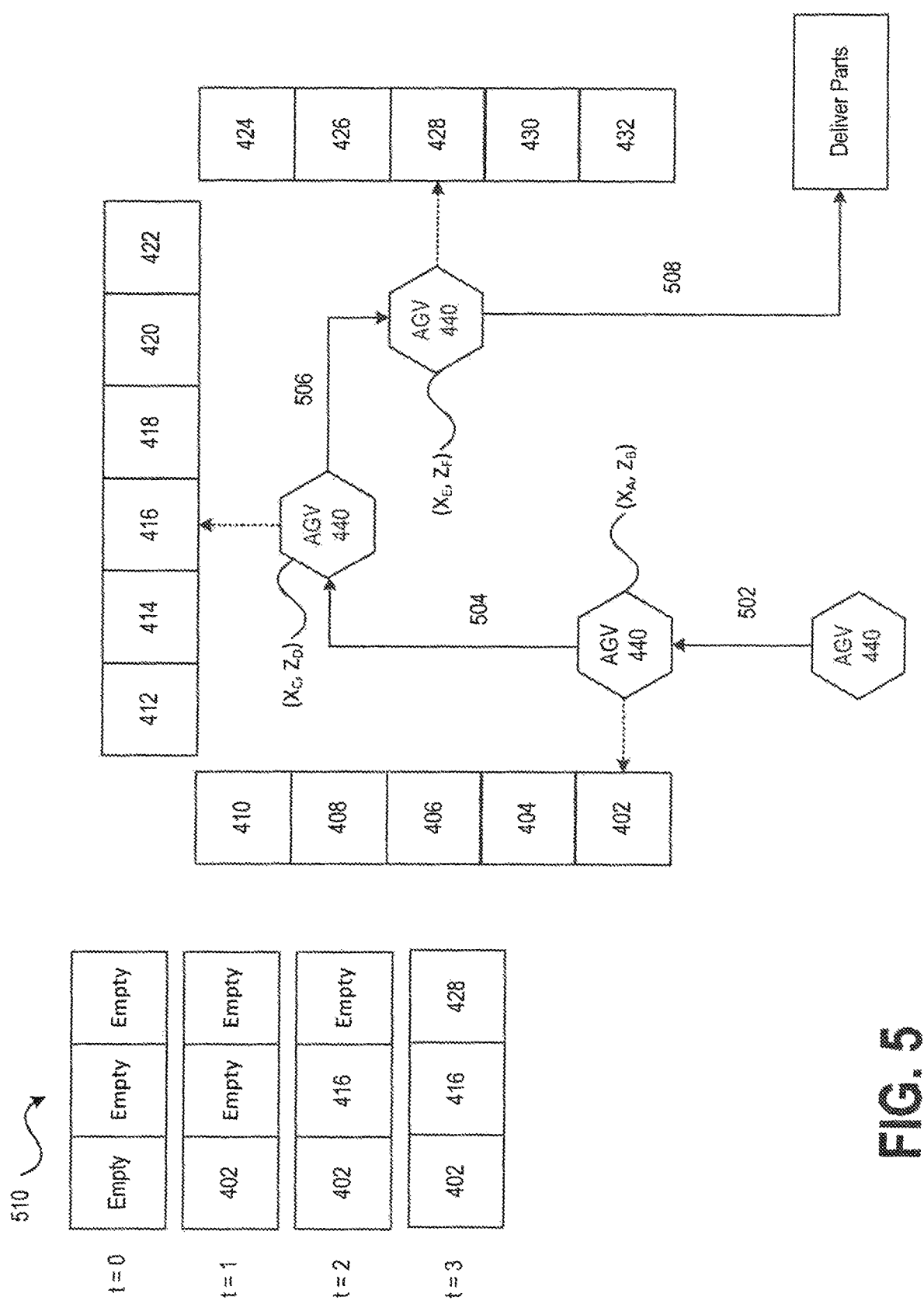
FIG. 5 is a block diagram illustrating navigation of an AGV during item retrieval in accordance with embodiments of the present disclosure.

Referring to FIG. 5, a block diagram illustrating navigation of an AGV during item retrieval in accordance with embodiments of the present disclosure is shown. In the example illustrated in FIG. 5, the AGV 440 of FIG. 4 is shown navigating through an area to retrieve one or more particular items from among the plurality of items 402-432 of FIG. 4. The AGV 440 may initiate retrieval of the items in response to receiving information from one or more external devices or systems, such as one of the servers 120 of FIG. 1 and/or the user device(s) 150 of FIG. 1, as described above, Upon receiving the information indicating a request to retrieve items, the AGV 440 may process the retrieved information to identify the particular items to be retrieved and determine locations of the items within the coordinate system. It is noted that the locations determined for the items may be relative locations or absolute locations. When relative locations are utilized, the AGV 440 may determine a location within the coordinate system that is proximate the corresponding item, where the location may be determined "proximate" to the corresponding item when the location is within a threshold distance of the item location. As an example, the threshold distance may be approximately 2-3 feet such that a user can easily retrieve the item and place it in a particular bin of the AGV 440. When absolute locations are utilized, the AGV 440 may determine a location that is directly in front of the location of the corresponding item (e.g., the AGV 440 is aligned with the item in a particular axis of the coordinate system, such as an "X" axis or a "Z" axis).

As illustrated in FIG. 5, the items to be retrieved may include items 402, 416, and 428. As explained above with reference to FIG. 4, item 402 may be associated with a location $(X_1, Z_1)$, item 416 may be associated with a location $(X_4, Z_6)$, and item 428 may be associated with a location $(X_8, Z_3)$. Based on identifying, the items to be retrieved and their corresponding locations, the AGV 440 (e.g., the navigation module 258) may determine a route or path of travel that the AGV 440 will traverse during retrieval of the items 402, 416, 428. In the example illustrated in FIG. 5, the AGV 140 may determine a first waypoint having coordinates $(X_A, Z_B)$ where the AGV 440 may stop to retrieve the item 402, a second waypoint having coordinates $(X_C, Z_D)$ where the AGV 440 may stop to retrieve the item 416, and waypoint having coordinates $(X_E, Z_F)$ where the AGV 440 may stop to retrieve the item 428. If absolute locations are utilized, the first waypoint may be aligned with the coordinates of the location of the item 402 in the "Z" axis (e.g., $X_A, Z_1$), the second waypoint may be aligned with the coordinates of the location of the item 416 in the "X" axis (e.g., $X_4, Z_D$), and the third waypoint may be aligned with the coordinates of the location of the item 428 in the "Z" axis (e.g., $X_E, Z_3$). If relative locations are utilized the first, second, and third waypoints may be locations that are within a threshold distance of the corresponding items but may not necessarily be aligned with the item locations in a particular axis.

Having determined the waypoints for retrieval of the items, the AGV 440 may calculate a route for retrieving the items. In an aspect, the route may be determined to minimize the distance traveled during retrieval of the items. To illustrate, assume the starting position of the AGV 440 is shown in FIG. 5 and as shown at time (t) instance t=0 at least three of the bins of the AGV 440 are empty, as indicated at 510. The determined route follows the path 502 until the first waypoint $(X_A, Z_B)$ is reached, At time t=1, the first item 402 is placed in the first bin and the other two bins remain empty. The AGV 440 then navigates along path 504 until the second waypoint $(X_C, Z_D)$ is reached, At time t=2, the second item 414 is placed in the second bin and the other bin remain empty. The AGV 440 then navigates along path 506 until the third waypoint $(X_E, Z_F)$ is reached. At time t=3, the third item 428 is placed in the third bin and all items to be retrieved have been placed in bins on the AGV 440. Upon the final item being placed into the third bin, the AGV 440 may travel along path 508 to a final waypoint where the items are delivered (e.g., to a production facility, an assembly station, and the like). As can be appreciated, starting from the begging location, the route traversed by the AGV 440 is minimized as compared to other possible routes, such as relieving item 428 first, then item 402 second, and then item 416 last.

In an aspect, servers (e.g., one of the servers 120 of FIG. 1) may determine the particular AGV to assign for a particular parts retrieval based on various characteristics of the available AGVs, such as a location of the AGVs relative to the items to be retrieved, the configuration of the bins for each AGV (e.g., do the available AGVs have the correct quantity and/or size of bins needed to retrieve the particular items requested, do the AGVs have sufficient power to travel a route and retrieve all of the items, etc.). Additionally, there may be multiple storage locations from which the items are available for retrieval. In such instances, an interplant procurement process may be executed to select a particular facility from which the items will be retrieved. The interplant procurement process may be configured to optimize the selection of a facility that will be suitable to procure the items from in terms of cost, time, distance, availability (e.g., are all of the items on hand or are any of them out of stock), and capacity. The interplant procurement process may utilize machine leaning algorithms and a rule engine to evaluate facility and AGA/selection. As an example, a K-Nearest Neighbor (KNN) algorithm may be used to identify the suitable facility for procurement of the items.

The KNN algorithm may be used for both classification and regression predictive problems and may interpret the situation and decide a course of action, which enables low calculation times to be realized. To illustrate, the KNN interplant procurement processing rosy be performed on the basis of minimum distance from the input instance to training samples. When there is a shortage in stock for an item due to unforeseen requirements coming in, the KNN algorithm may be initiated to execute the interplant procurement process to identify a suitable facility for procurement of the items by the role engine. The core algorithm for KNN algorithm of the rule engine may be configured to analyze the various facilities based on the facility capabilities and choose an optimal facility, such as a facility that has all items of interest available, is capable of using the items to manufacture or assembly the ordered product(s), have available production/manufacturing capacity to complete the manufacturing or assembly process in a required amount of time, and the like. As another example, if a particular facility is overloaded (e.g., demand exceeds capacity), the rules engine may utilize the KNN process to identify alternative locations or facilities that are not overloaded and move the production process itself from the initial facility to a different facility that has the capability and capacity to handle the production process.

The KNN algorithm may receive or be provided (e.g., by the rules engine) with a set of training samples, which may include data and metrics associated with the available options. Such training samples may include information regarding the number of available manufacturing or assembly facilities, the production capabilities of each facility, inventory data associated with each facility, load information for each facility, location information for each facility, and other information. The rules engine may then classify the set of sample data into groups based on a set of parameters. Exemplary parameters that may be used by the rules engine(s) may include: available capacity, plants that have the capability (e.g., infrastructure, inventory, capacity or availability, etc.) to perform the manufacturing or assembly operations, and distance. Once the classification process has been completed, the rules engine may perform regression testing to identify which facility which is the most suitable plant based on the requirements under consideration, such as a current order or set of orders to be fulfilled.

Figure 6:
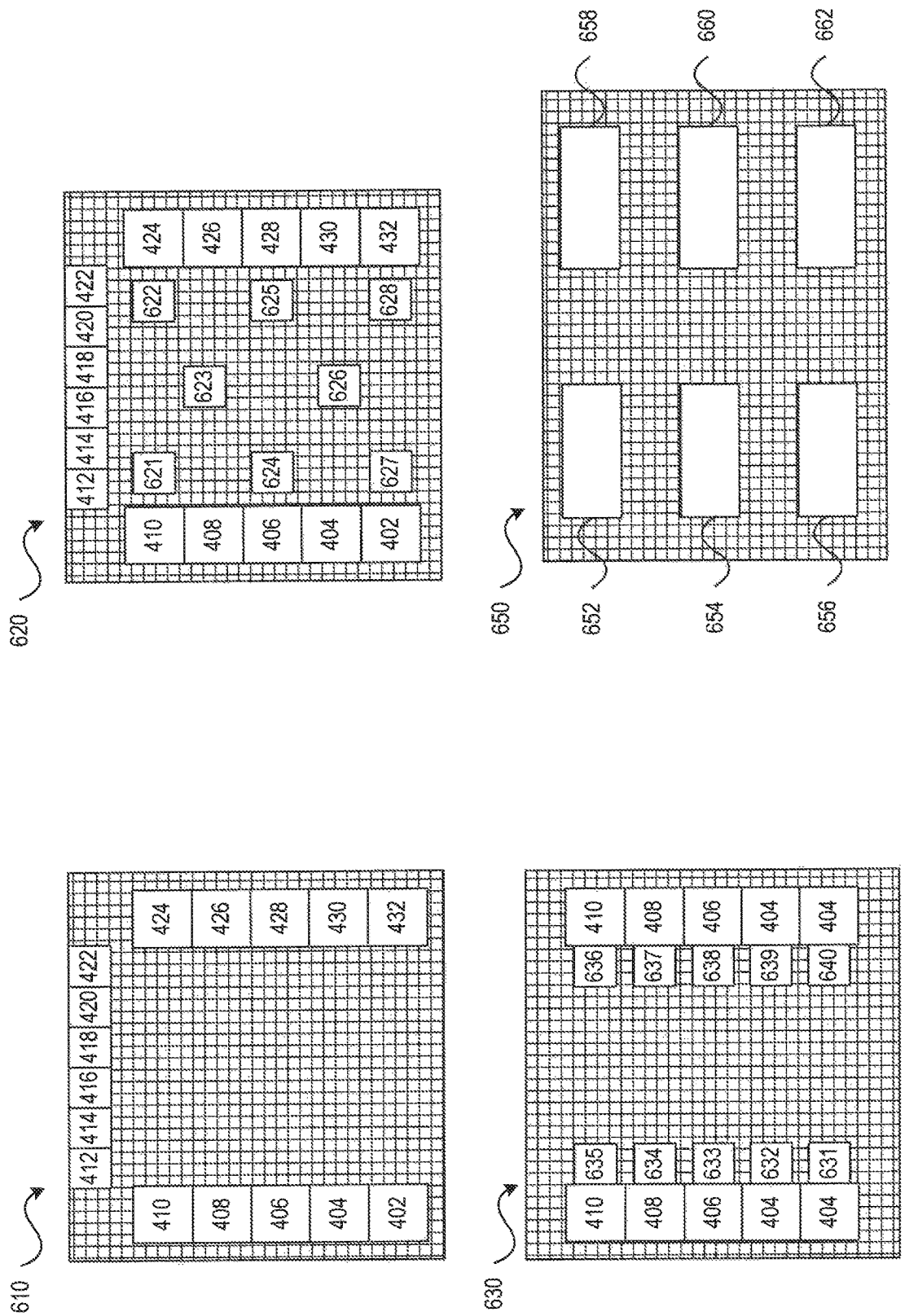
FIG. 6 shows block diagrams illustrating aspects of coordinate system functionality in accordance with embodiments of the present disclosure.

Referring to FIG. 6, block diagrams illustrating aspects of coordinate system functionality in accordance with embodiments of the present disclosure are shown. In FIG. 6, a first coordinate system 610 is shown. The first coordinate system 610 includes a virtual coordinate system in which grid floor mapping (GFM) techniques are utilized to establish a virtual coordinate system configured to facilitate navigation of a facility, as described above with reference to FIGS. 4 and 5, for example. It is noted that the virtualized coordinate system illustrated at 610 may be advantageous as compared to conventional GFM techniques that required a grid to be physically painted on a floor of a facility. Further, it is noted that the ability to control the distance traveled by AGVs using stepper motor-based navigation technique, as described above, may further contribute to the advantageous nature of the GFM approach disclosed herein, such as by not requiring modifications to the facility itself (e.g., the floor of the facility does not need to be painted, etc.).

Additionally, FIG. 6 illustrates a second coordinate system 620, which includes a plurality of beacons 621-628. Each of the beacons 621-628 may be associated with fixed locations within the coordinate system 620 and may be configured to generate signals that may be detected by an AGV. The AGV may use the signals received from the beacons to determine the location of the AGV within the coordinate system 620, such as by using time difference of arrival (TDA) techniques to triangulate the position of the AGV within the second coordinate system 620. In an aspect, the beacons 621-628 may include access points or some other form of wireless communication devices configured to generate signals that may be used for triangulating the position of the AGV within the coordinate system 620.

A third coordinate system 630 is also shown in FIG. 6, in the third coordinate system storage locations for each of the plurality of items 402-432 are configured with indicia 631-640, such as letters, images, barcodes, numbers, alphanumeric identifiers, or the like. The AGVs may be configured to traverse the facility floor and utilize the optical sensors to identify particular items within the facility, such as by storing information that maps particular indicia disposed in proximity to particular items. The AGV may traverse the facility and utilize the AGVs optical sensors (e.g., a camera) to recognize nearby indicia and then calculate further navigational steps or operations based on the detected indicia. It is noted that the different types of coordinate systems illustrated in FIG. 6 have been provided for purposes of illustration, rather than by way of limitation and that other types of coordinate systems may also be utilized in accordance with aspects of the present disclosure.

It is noted that the layouts of the shelves or storage infrastructure where the items 410-432 are stored, as depicted in FIGS. 4 and 5, as well as the exemplary coordinate systems 610, 620, 630 have been provided for purposes of illustration rather than by way of limitation and that coordinate systems of embodiments may be utilized with other types of storage infrastructure layouts. For example, a fourth coordinate system 650 is shown and includes shelves 652, 654, 656, 658, 660, 662 arranged into rows and columns. Each of the shelves 652, 654, 656, 658, 660, 662 may be single sided or double sided shelves configured to store items for subsequent retrieval according to the techniques disclosed herein. As described above, the items stored on the shelves 652, 654, 656, 658, 650, 662 may each be associated with a particular location within the fourth coordinate system 650 and the locations of the items may be utilized to determine one or more waypoints for retrieving items stored on the shelves 652, 654, 656, 658, 660, 662 using the techniques described above with reference to FIGS. 4 and 5. The layout illustrated with respect to the coordinate system 650 may be more representative of large warehouse-type environments to which the concepts disclosed herein may readily be applied. It is noted that the coordinate system and the devices utilizing the coordinate system to facilitate retrieval of items may recognize that portions of the coordinate system are not suitable for travel by the AGV. For example, regions within the coordinate system occupied by the storage infrastructure, such as the shelves 652, 654, 656, 658, 660, 662, may be designated or understood to be non-traversable by the AGV and determination of waypoints may be configured to route around the areas occupied by the storage infrastructure.

Figure 7:
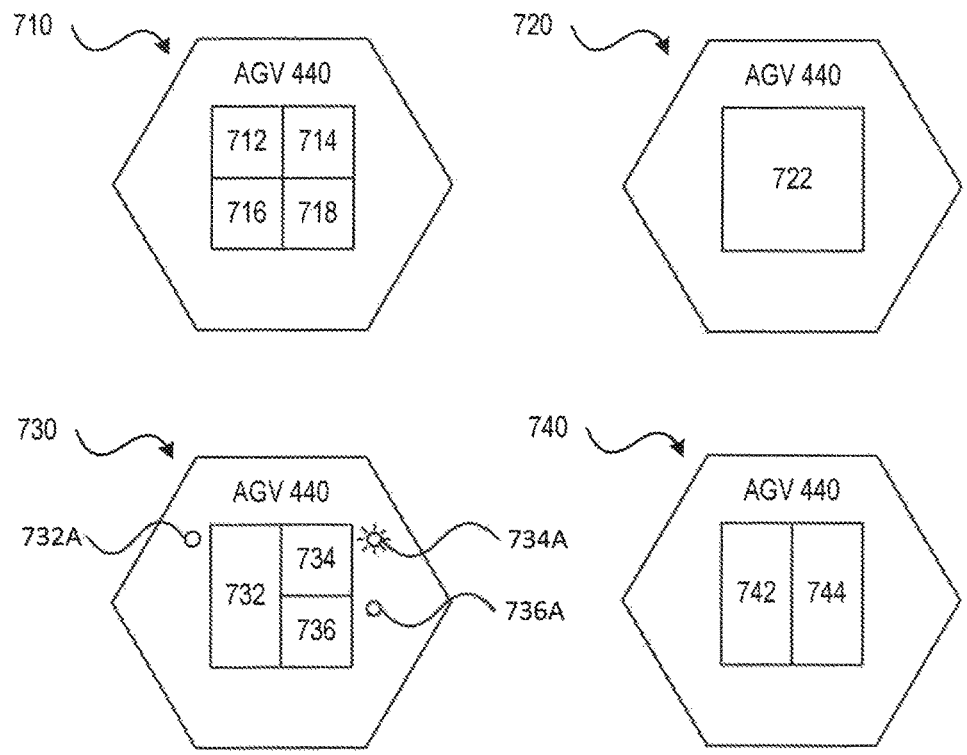
FIG. 7 is a block diagram illustrating different AGV bin configurations in accordance with embodiments of the present disclosure.

Referring to FIG. 7, a block diagram illustrating different AGV bin configurations in accordance with embodiments of the present disclosure is shown. In FIG. 7, a first bin configuration 710 illustrates an AGV having four bins 712-718; a second bin configuration 720 illustrates an AGV having one bin 722; a third bin configuration 730 illustrates an AGV having three bins 732-736; and a fourth bin configuration 740 illustrates an AGV having two bins 742, 744. As described above, the particular bins configured for each AGV may be adjustable depending on the particular demand present at a facility where the AGVS are being operated. For example, the first bin configuration illustrated at 710 includes four equally or approximately (e.g., +/− a determined distance) equal sized bins, the bin configuration illustrated by bin configuration 720 include a single large bin, and the third bin configuration 730 includes two bins 734, 736 similar in size to the bins 712, 714, 716, and 718 illustrated in the first bin configuration 710 and also includes an elongated bin 732 that is larger in size than the bins 734, 736. Similarly, the fourth bin configuration includes two elongated bins 742, 744. The ability to customize the particular bins for which an AGV is configured may enable certain AGVs to be operated more efficiently, such as to include many smaller bins when items to be retrieved by the AGV are small and larger bins when larger items are to be retrieved.

In an aspect, one or more of the bins configured for a particular AGV may include optical sensors (e.g., LED lights, etc.) configured to associate retrieved items with a particular bin secured to the bin interface of the AGV. For example, as shown in the third bin configuration 730, optical sensors 732A, 734A, 736A may be associated with each bin. When a particular item corresponding to one of the bins of the AGV is to be retrieved (e.g., the AGV is proximate to or near the next item to be retrieved, the optical sensor corresponding to the item may be activated (e.g., lit up) in order to indicate into which bin the retrieved item should be placed. For example, in FIG. 7, optical sensor 734A is "lit up" to indicate that the AGV is near the item that is to be placed into the bin 734. When the item is placed into bin 734, a weight sensor or other technique may be utilized to verify the correct item (and/or correct quantity of items) has been placed into the bin 734, if the AGV determined that the correct item(s) has been placed in bin 734, the optical sensor may be deactivated. If the wrong item has been placed into bin 734 (e.g., based on weight data or some other form of feedback), the optical sensor may begin to flash or some other type of alert may be generated, such as a sound being played or a notification (e.g., a short messaging service (SMS) message may be transmitted to the user retrieving the items). Providing the optical sensors associated with each bin may ensure that retrieved items are placed into the correct bins, which may ensure that the items are retrieved correctly and may minimize the amount of time required to retrieve the items.

Figure 9:
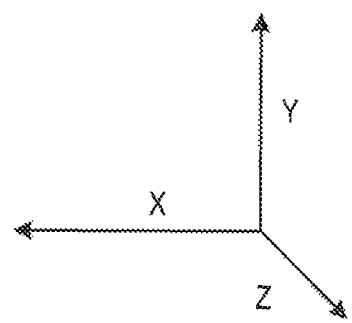
FIG. 9 is a block diagram illustrating aspects of utilizing a 3 dimensional coordinate system in accordance with embodiments of the present disclosure.
Figure 9:

Referring to FIG. 9, a block diagram illustrating aspects of utilizing a 3 dimensional coordinate system in accordance with embodiments of the present disclosure is shown. As briefly mentioned above, aspects of the present disclosure may be configured to utilize coordinate systems to navigate AGVs into proximity with items to be retrieved. While the examples described above with reference to FIGS. 4 and 5 have illustrated concepts related to 2 dimensional coordinate systems, embodiments are not limited to 2 dimensional coordinate systems. In FIG. 9, a plurality of items 901-944 are illustrated as being oriented vertically, such as may occur when items are stored on shelves within a facility. As described above, the AGV may navigate to the location of the item of interest (e.g., the next item to be retrieved) based on a coordinate location of the item of interest and one or more determined waypoints. Once the AGV arrives at the item of interest (e.g., using relative or absolute locations), the AGVs may initiate operations to identify the item of interest in 3 dimensional space to the user (e.g., the individual that will retrieve the item of interest from its storage location and load it into the appropriate bin of the AGV, as described above. In an aspect, AGVs may initially move according to just the coordinates. However, over time the AGVs may utilize machine learning techniques to identify the series of waypoints used to retrieve items. For example, as explained above the AGV is may include sensors that may be used to detect obstacles along a determined path of travel. If an AGV encounters such obstacles multiple times, the navigation module of the AGV may update information associated with the coordinate system to indicate the presence of the obstacle. The updated coordinate system information may be subsequently used by the AGVs navigation module determine routes that are not obstructed by the obstacle, which improves the route planning capabilities of the AGV and ensures that optimal (e.g., shortest distance, etc.) paths are used to retrieve items.

Figure 10:
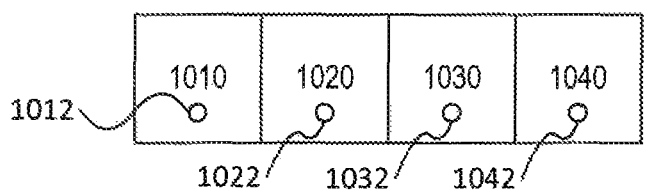
FIG. 10 is a block diagram illustrating aspects of identifying an item of interest in accordance with embodiments of the present disclosure.
Figure 10:
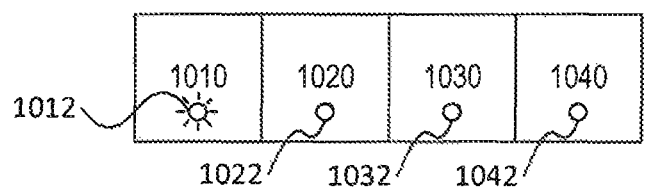

In an example, the AGV may utilize an optical sensor, Such as a laser, to identify the item of interests to the user, such as by pointing a laser at the item of interest. Alternatively, the AGV may transmit a message to a server (e.g., one of the servers 130 of FIG. to indicate that the AGV has arrived at the location associated with the item of interest and the server may activate one or more optical sensors that indicate the storage location for the item of interest. For example, and referring to FIG. 10, a block diagram illustrating aspects of identifying an item of interest in accordance with embodiments of the present disclosure is shown. In FIG. 10, storage locations associated with a plurality of items 1010, 1020, 1030, 1040 are shown. Each of the storage locations may include an optical sensor, illustrated in FIG. 10 as optical sensors 1012, 1022, 1032, 1042. The optical sensors 1012, 1022, 1032, 1042 may include LEDs that may be selectively activated (or "lit up") to indicate the next item of interest. For example, as shown in the bottom of FIG. 10, optical sensor 1012 may be activated to indicate that one or more items of interest are housed in the storage location associated with the activated optical sensor. Once the item(s) of interest is retrieved from the storage location and loaded into the appropriate bin of the AGV, the optical sensor may be deactivated and the AGV may traverse to the next waypoint along its travel route.

Referring back to FIG. 9, suppose that the item of interest corresponds to item 921, As described with reference to FIG. 10, an optical sensor associated with the storage location of item 921 may be activated, thereby allowing rapid identification of the item of interest in 3 dimensional space. In an aspect, when the item is correctly loaded onto the AGV, the optical sensor associated with the storage location of the item 921 may be deactivated (e.g., turned off). Alternatively, activation of the optical sensor may be configured to last for a predetermined duration (e.g., 10 seconds, 20 seconds, or some other defined period of time) after which the optical sensor is turned off.

Figure 11:
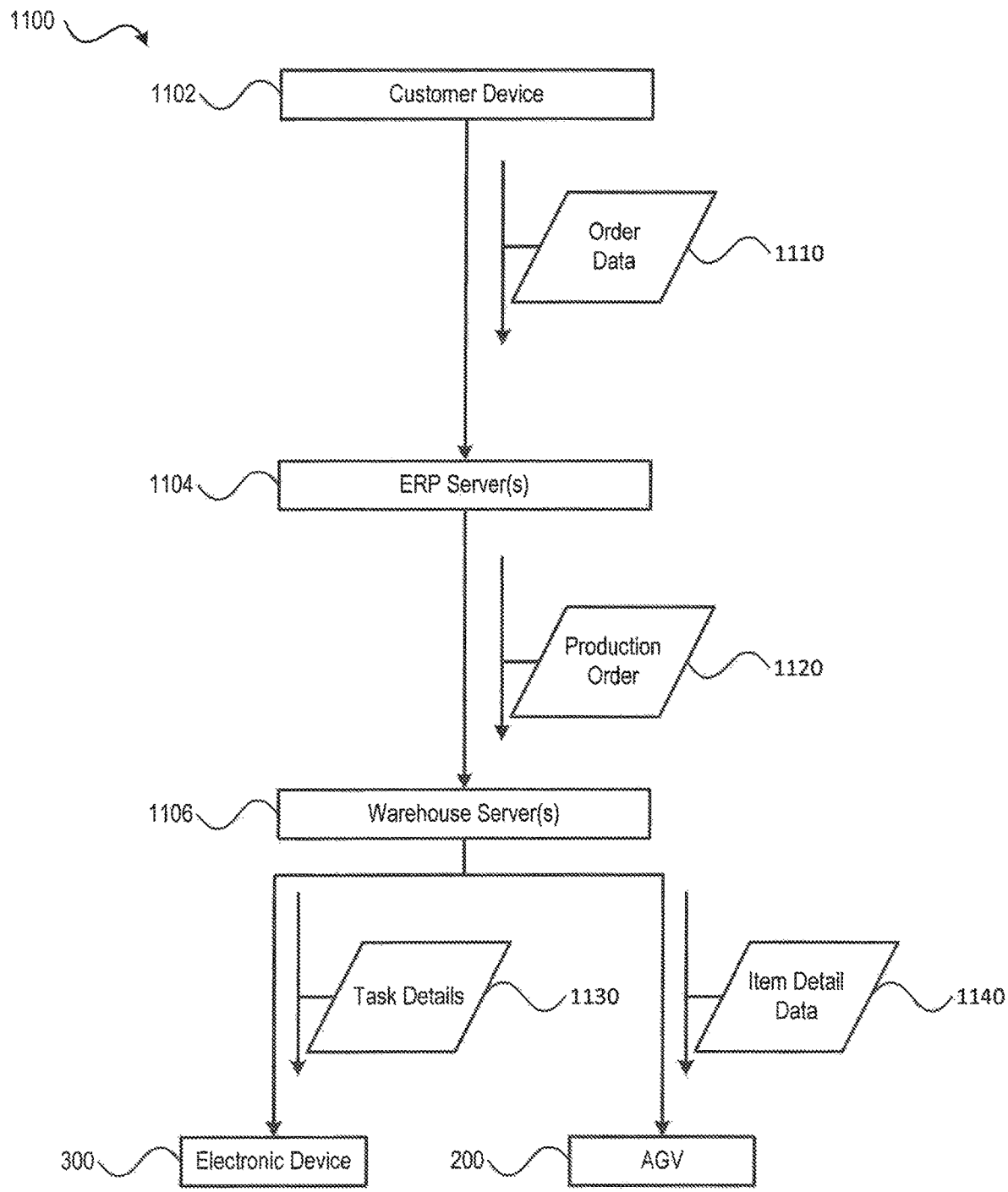
FIG. 11 is a flow diagram of an exemplary process for retrieving items from a facility using AGVs in accordance with embodiments of the present disclosure.

Referring to FIG. 11, a flow diagram of an exemplary process for retrieving items from a facility using AGVs in accordance with embodiments of the present disclosure is shown as a process 1100. It is noted that aspects of the process 1100 may be performed by a system, such as the system 100 illustrated and described with reference to FIG. 1, Additionally, aspects of the process 1100 may be facilitated, at least in part, by AGVs configured to perform the operations described above with reference to FIGS. 2 and 4-10.

At step 1102, a customer device (e.g., the customer device 110 of FIG. 1) may access the relevant system, such as by accessing a web portal via an application, which may be a web browser-based application or a standalone application installed on the customer device, After authenticating the customer via the application, the customer may be authorized to configure an order, such as by specifying a final product to be purchased or produced. Once configured via the application, order data 1110 may be transmitted to an enterprise resource planning (ERP) server 1104, which may be one of the servers 130 illustrated in FIG. 1, Upon receiving the order data 1110, the ERP server 1104 may be configured to distribute the order data to a warehouse server 1106 as production order data 1120. In an aspect, the warehouse server 1106 to which the production order data 1120 is distributed may be determined using the KNN algorithm described above. For example, a particular warehouse having the appropriate production capacity and item availability may be determined from among a plurality of available warehouse facilities and after identifying the particular warehouse, the production order data 1120 may be transmitted to the corresponding warehouse server 1106.

The warehouse server 1106 may be an additional one of the servers 130 of FIG. 1. Upon receiving the production order data 1120, the warehouse server 1106 may analyze the production order data to generate a task list. The task list may identify the item(s) to be retrieved, the bin into which the item(s) is to be placed, and other information (e.g., a task identifier, etc.). The task list may be transmitted to the electronic device 300 as task details data 1130 and may be transmitted to the AGV 200 as item detail data 1140. The information included in the task details data 1130 may be presented at the user device 300 of FIG. 3, as described above with reference to FIGS. 12A-12E. The instructions 322 stored at the memory 320 of the electronic device 300 may include instructions to translate the task details data 1130 into one or more interface elements presented to the user, such as the interface elements described above with reference to the display regions corresponding to different items described above with reference to FIGS. 12A-12E. Alternatively or additionally, the memory 320 of the electronic device 300 may store one or more templates that may be populated with information from the task details data 1130.

The item detail data 1140 provided to the AGV 200 may include information that associates particular items with particular bins of the AGV 200, For example, each item may be associated with a particular size of bin depending on the size of the item and the quantity of the item to be retrieved. As described above, sensors of the AGV 200 may be utilized to verify (e.g., by weight) that the correct item or quantity of items have been placed within the correct bin, in an aspect, the particular AGV 200 to which the item detail data is transmitted may be selected by the warehouse server 1106. For example, after generating the task list based on the production order data 1120, the warehouse server 1106 may determine a current status of one or more AGVs at a selected warehouse facility, where the current status indicates whether the AGV is currently being used to retrieve items or is available for use in retrieving the item(s) indicated in the production order data 1120, whether the AGV has the correct bin configuration (or requires reconfiguration to have the correct number and size of bins), and the like.

Once the task details information 1130 and the item detail data 1140 have been provided to the electronic device 300 and the AGV 200, respectively, the item(s) may be retrieved using the processes described above with reference to FIGS. 2-10. For example, the AGV 200 may determine a route for retrieving the item(s) from the facility and may navigate to one or more waypoints to retrieve the items. The AGV 200 may stop at each waypoint here an item is to be retrieved and the user associated with the electronic device 300 may obtain the item corresponding to the current waypoint and place the item in the correct bin, which may be indicated by one or more optical devices disposed on the bin interface of the AGV, as described above with reference to FIG. As the items are retrieved, the user may interact with the graphical user interface displayed at the display screen 1202 of the electronic device 300 to indicate whether items have been success ally retrieved and feedback based on the user interaction with the graphical user interface, as well as feedback generated by the AGV 200, may be transmitted to one or more remote servers, such as the warehouse server 1106 to indicate the successful retrieval of the items, Once all items have been successfully retrieved, the AGV 200 may navigate to a destination waypoint, where the items may be unloaded from the bins for use in further processes (e.g., manufacturing or assembly processes).

As the feedback is received at the warehouse server 1106, one or more databases may be updated. For example, an inventory database may be updated to reflect that the retrieved items have been consumed and inventory quantities on hand for the retrieved items may be reduced based on the particular quantities of the item(s) retrieved. As explained above, by using feedback from both the electronic device 300 and the AGV 200, erroneous item retrievals may be quickly identified and corrected, thereby improving the accuracy of records of the inventory database. Further, by ensuring that the correct items are retrieved, delays that may otherwise occur if the incorrect item(s) is retrieved or the incorrect quantity of the item(s) is retrieved may also be eliminated, such as delays in completing the processes that utilize the retrieved parts.

Figure 13:
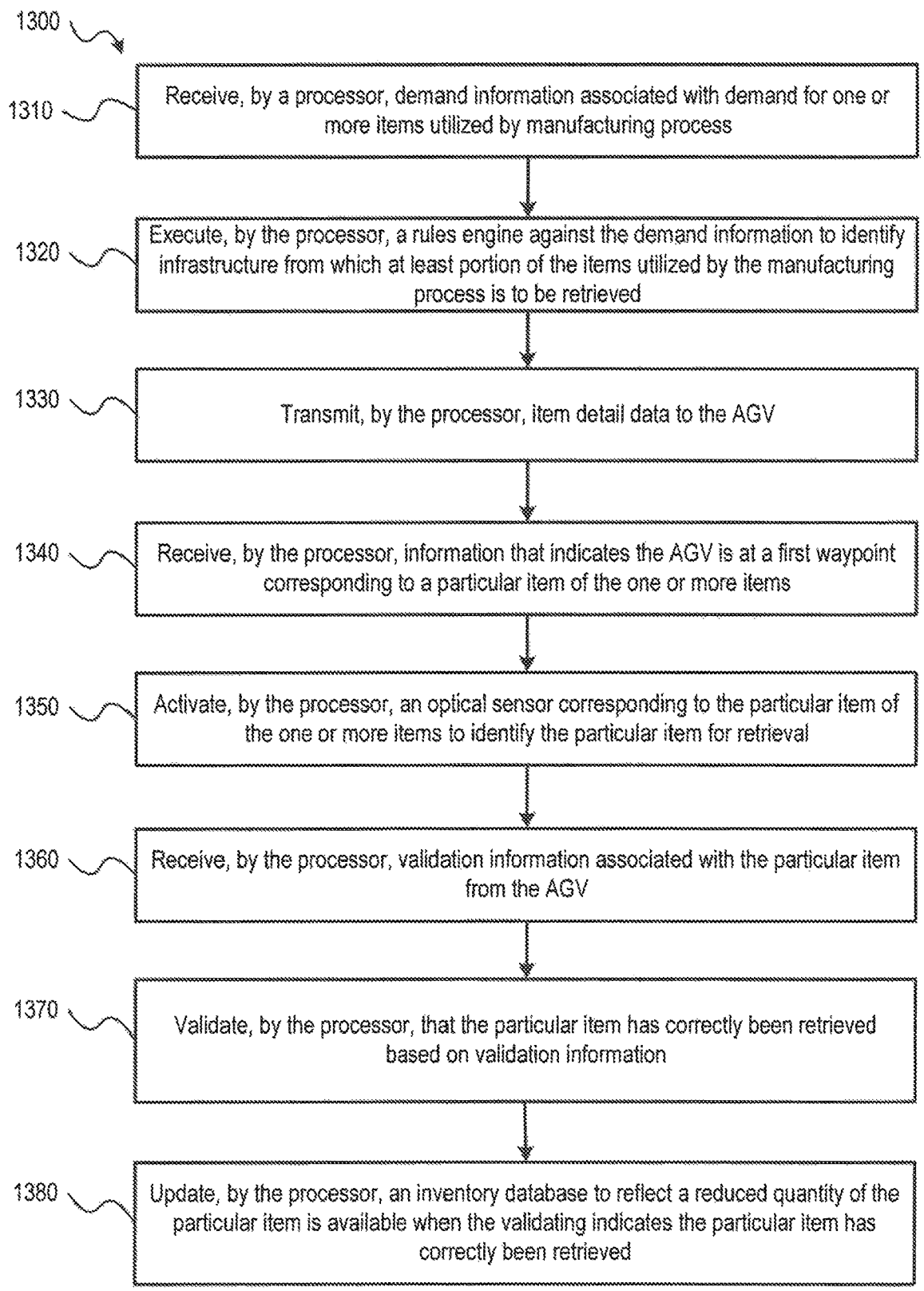
FIG. 13 is a flow diagram of an exemplary method for retrieving items from an item and storage infrastructure in accordance with embodiments of the present disclosure.

Referring to FIG. 13, a flow diagram of an exemplary method for retrieving items from an item and storage infrastructure in accordance with embodiments of the present disclosure is shown as a method 1300. In aspects, the method 1300 may be performed one or more processors, such as one or more processors of the system components illustrated in FIG. 1. Steps of the method 1300 may be stored as instructions that, when executed by the one or more processors, cause the one or more processors to perform operations to retrieve items in accordance with the concepts described in the present disclosure.

At step 1310, the method 1300 includes receiving, by a one or more processors, demand information associated with demand for one or more items utilized by manufacturing process. As explained above with reference to FIGS. 1 and 11, the demand information may be determined based on information received by an ERP server (e.g., one of the servers 120 of FIG. 1 and the ERP server 1104 of FIG. 11) from one or more customer devices (e.g., the one or more customer devices 110 of FIG. 1 and the customer device(s) 1106 of FIG. 11). The demand information may be based on information included in an order received from the customer device(s), or may be based on historic demand information, such as historic demand information stored in one of the one or more databases 130 of FIG. 1.

At step 1320, the method 1300 includes executing, by the one or more processors, a rules engine against the demand information to identify infrastructure from which at least portion of the items utilized by the manufacturing process are to be retrieved. As explained above, the rules engine may utilize a KNN algorithm to select the item and storage infrastructure that is to be used to retrieve the items (or a portion thereof) and may also be utilized to select an AGV that is to be used to retrieve the items. The item and storage infrastructure may be selected based on whether the item and storage infrastructure has a current quantity of at least the portion of the items on hand that is sufficient to meet the demand. As described above, the KNN algorithm may also evaluate the available AGVs at the selected item and storage infrastructure to identify an AGV that has the appropriate number of bins, bin sizes, availability, etc, to retrieve the items.

At step 1330, the method 1300 includes transmitting, by the one or more processors, item detail data to the AGV. As described above with reference to FIG. 11, the item detail data may identify one or more items to be retrieved, a quantity to be retrieved for each of the one or more items, and information identifying a location of each of the one or more items within a coordinate system. Alternatively, the location of each of the one or more items may be determined autonomously by the AGV or by accessing a remote database (e.g., one of the databases 130 of FIG. 1) to obtain information associated with the locations of the one or more items, as described above with reference to FIGS. 2, 4, and 5. The coordinate system may be calibrated to a distance corresponding to an incremental movement of traction components of the AGV when the traction components of the AGV are driven by one or more motors of the AGA. For example, as described above with reference to FIGS. 2 and 4, the traction components of the AGV may include tires and/or treads driven by a stepper motor and the coordinate system may be calibrated to a distance traveled by the AGV in response to a predetermined number of steps of the stepper motor. In an aspect, other types of coordinate system that are not specifically calibrated to incremental movements of the traction components may be utilized to navigate the AGV, such as the exemplary techniques described above with reference to FIG. 6.

At step 1340, the method 1300 includes receiving, by the one or more processors, information that indicates the AGV is at a first waypoint corresponding to a particular item of the one or more items and at step 1350, activating, by the one or more processors, an optical sensor corresponding to the particular item of the one or more items to identify the particular item for retrieval. As described above with reference to FIGS. 4, 5, 9, and 10, storage locations associated with items stored in the item and storage infrastructure may include optical sensors that may be activated to identify (e.g., to a user) the particular location of an item that is to be retrieved. This ensures that the user retrieves the correct item or at least minimizes, the risk that the user retrieves the incorrect item. As described above with reference to FIG. 7, the AGV may also be configured to activate an optical sensor corresponding to a particular bin of the AGV while at the first waypoint. The optical sensor that is activated may correspond to a particular bin of the AGV and may identify a location where the particular item is to be placed upon retrieval from the item and storage infrastructure. It is noted that in alternative embodiments, step 1340 may be omitted and/or replaced with automated retrieval of the item associated with the first waypoint by item retrieval components of the AGV, as described above with reference to FIG. 2.

At step 1360, the method 1300 includes receiving, by the one or more processors, validation information associated with the particular item from the AGV and at step 1370, validating, by the one or more processors, that the particular item has correctly been retrieved based on validation information. As described above, the AGV may include a Sensor configured to determine a weight of the particular item once the particular item has been placed in the bin of the AGV. The AGV may be configured to transmit the weight of the particular item to a server as validation information and the server may perform the validating based on whether the weight indicated in the validation information matches a weight of the particular item. If the particular item has not been correctly retrieved, one or more alerts may be generated and transmitted to a user device to alert to the user that the item has not been correctly retrieved. The alert may be an SMS message, an auditory message, and the like. Additionally or alternatively, the AGA/may receive an alert that triggers flashing of the optical sensor associated with the bin into which the particular item has been placed or some other form of alert provided by the AGV, such as an auditory alert.

At step 1380, the method 1300 includes updating, by the one or more processors, an inventory database to reflect a reduced quantity of the particular item is available when the validating indicates the particular item has correctly been retrieved. As explained above, by providing validation for items retrieved according to the method 1300, inventory databases may be maintained in a state that accurately reflects, in real-time, current quantities of items available for consumption during manufacturing/assembly processes. Additionally, the feedback techniques provided by the method 1300 ensure that user errors with respect to item retrieval are minimized or completely eliminated, which reduces the chance that a manufacturing process is halted due to incorrect items being provided to the manufacturing/assembly area. Further, by utilizing the AGV to transport items from the item and storage infrastructure to the manufacturing/assembly area, item retrieval processes may be performed more efficiently, both in terms of cost and availability (e.g., AGVs may operate for prolonged periods of time with minimal or no interaction with users).

As explained above with respect to FIGS. 11 and 12A-12E, the method 1300 may also include transmitting, by the processor, task detail data to a user device. The task detail data may be configured to display one or more tasks to be completed by a user associated with the user device during retrieval of at least the portion of the items on a display screen of the user device, such as the exemplary tasks illustrated in FIGS. 12A-12E. The one or more tasks to be completed may be displayed as one or more interactive elements within a graphical user interface that provides visual information associated with each of the one or more tasks and one or more interactive elements configured to solicit input(s) from the user regarding completion of each of the one or more tasks. Additionally, each of the one or more tasks may be displayed within the graphical user interface according to a color scheme configured to apply different colors to different tasks of the one or more tasks to indicate a task completion state.

In an aspect, the method 1300 may also include calculating, by the one or more processors, a series of waypoints associated with retrieval of, at least the portion of the one or more items. The series of waypoints may identify one or more locations within the coordinate system where the AGV is to navigate during retrieval of at least the portion of the one or more items and a final destination where at least the portion of the one or more items are to be delivered by the AGV after all items included in at least the portion of the one or more items have been correctly retrieved. Alternatively or additionally, the AGV may include a navigation module configured to calculate the series of waypoints. In aspects, the series of waypoints may be calculated by the AGV based on the item detail data (e.g., the item detail data 1140 of FIG. 11), such as by determining coordinates associated with the item(s) specified in the item detail data within the coordinate system and plotting a route to retrieve the items based on the determined coordinates. Where obstacles have been previously identified by the AGV, information associated with those obstacles may be taken into account when calculating the series of waypoints, such as to determine a route that bypasses any known obstacles, as described above. Alternatively, the series of waypoints may be calculated by a server (e.g., the one or more servers 120 of FIG. 1, the ERP server 1104 of FIG. 11 the warehouse server 1106 of FIG. 11) and included in the item detail data received by the AGV. When the series of waypoints is received by the AGV from a remote server, the navigation module of the AGV may determine an order in which each of the waypoints is visited and a route for navigating to each of the waypoints. In some aspects, the routing between waypoints may also be specified by the remote server and the AGV may adjust the specified route based on obstacles encountered during movement along the route.

As described above, operations of the method 1300 may facilitate faster retrieval of items for use in manufacturing or assembly processes. For example, providing real-time feedback to users to indicate the location of items to be retrieved (or retrieving the items automatically) may enable rapid identification and retrieval of items, allowing those items to be collected and delivered to manufacturing processes more rapidly. For user-aided retrieval processes, the disclosed embodiments provide real-time analysis and verification processes that ensure items are correctly retrieved and generate alerts when incorrect items are retrieved or are loaded onto the AGV incorrectly. Further, the real-time analysis and verification processes may be utilized to provide feedback to inventory management systems to enable real-time tracking of inventory in an automated and accurate manner that eliminates the need to perform manual audits of inventory and avoids delays that may occur in a manufacturing process if inventory levels inaccurately reflect availability of items within an item and storage infrastructure. It is noted that the method 1300 provides additional advantages over prior processes, such as the benefits described above with reference to FIGS. 1-12, which are not repeated here for simplicity of the disclosure.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed:

1. A method comprising:
   receiving, by a processor, demand information,
      the demand information associated with demand for one or more items utilized by a manufacturing process;
   executing, by the processor, a rules engine against the demand information,
      the executing configured to identify infrastructure from which at least portion of the items utilized by the manufacturing process is to be retrieved,
      wherein the infrastructure comprises at least one automated guided vehicle (AGV) and an item and storage infrastructure having a current quantity of at least the portion of the items on hand to meet the demand;
   transmitting, by the processor, item detail data to the AGV,
      the item detail data identifying:
         one or more items corresponding to at least the portion of the items,
         a quantity to be retrieved for each of the one or more items, and
         information identifying a location of each of the one or more items within a coordinate system,
      wherein the coordinate system is calibrated to a distance corresponding to an incremental movement of traction components of the AGV when the traction components of the AGV are driven by one or more motors of the AGV;
   determining, by the processor, a sequence of incremental movements of the traction components to travel from a starting location to the first waypoint based on the coordinate system, wherein the sequence of incremental movements comprises a pre-determined number of incremental movements of the traction components to reach the first waypoint from the starting location;
   driving, by the one or more motors, the one or more traction components according to the sequence of incremental movements to navigate the AGV from the starting location to the first waypoint based on the pre-determined number of incremental movements of the traction components;
   receiving, by the processor, information that indicates the AGV is at a first waypoint,
      the first waypoint corresponding to a particular item of the one or more items;
   activating, by the processor, an optical sensor,
      the optical sensor corresponding to the particular item of the one or more items,
      wherein activation of the optical sensor is configured to identify the particular item for retrieval;
   receiving, by the processor, validation information associated with the particular item,
      the validation information received from the AGV;
   validating, by the processor, that the particular item has correctly been retrieved based on validation information; and
   updating, by the processor, an inventory database,
      the updating configured to reflect that a reduced quantity of the particular item is available when the validating indicates the particular item has correctly been retrieved.

2. The method of claim 1, further comprising transmitting, by the processor, task detail data to a user device,
   the task detail data is configured to display one or more tasks to be completed by a user associated with the user device during retrieval of at least the portion of the items on a display screen of the user device.

3. The method of claim 2, wherein the one or more tasks to be completed are displayed as one or more interactive elements within a graphical user interface,
   the graphical user interface providing:
      visual information associated with each of the one or more tasks, and
      an interactive element configured to solicit input from the user regarding completion of each of the one or more tasks.

4. The method of claim 3, wherein each of the one or more tasks are displayed according to a color scheme,
   the color scheme applies different colors to different tasks of the one or more tasks to indicate a task completion state.

5. The method of claim 1, wherein the one or more motors comprises a stepper motor, wherein traction components of the AGV are driven by the stepper motor, and wherein the coordinate system is calibrated to a distance traveled by the AGV in response to a predetermined number of steps of the stepper motor.

6. The method of claim 1, wherein the AGV is configured to activate an optical sensor corresponding to a particular bin of the AGV at the first waypoint,
   the optical sensor corresponding to the particular bin of the AGV identifying a location where the particular item is to be placed upon retrieval from the item and storage infrastructure.

7. The method of claim 6, wherein the AGV comprises a sensor configured to determine a weight of the particular item placed in the particular bin of the AGV,
   the validation information including the weight, and
   wherein the validating is configured to determine the particular item has correctly been retrieved based on whether the weight indicated in the validation information matches a weight of the particular item.

8. The method of claim 1, further comprising generating and transmitting an alert to a user device in response to the validating,
   the alert indicating that the particular item has not been correctly retrieved.

9. The method of claim 1, further comprising:
   calculating a series of waypoints associated with retrieval of at least the portion of the one or more items, the series of waypoints identifying:
one or more locations within the coordinate system where the AGV is to navigate during retrieval of at least the portion of the one or more items, and
a final destination where at least the portion of the one or more items are to be delivered by the AGV after all items included in at least the portion of the one or more items have been correctly retrieved.

10. A non-transitory computer-readable storage medium storing instructions that, when executed by one or more processors, cause the one or more processors to perform operations comprising:
receiving demand information,
the demand associated with demand for one or more items utilized by a manufacturing process;
executing a rules engine against the demand information,
the executing configured to identify infrastructure from which at least a portion of the items utilized by the manufacturing process is to be retrieved,
wherein the infrastructure comprises at least one automated guided vehicle (AGV) and item and storage infrastructure having a current quantity of at least the portion of the items on hand to meet the demand;
transmitting item detail data to the AGV,
the item detail data identifying:
one or more items corresponding to at least the portion of the items,
a quantity to be retrieved for each of the one or more items, and
information identifying a location of each of the one or more items within a coordinate system,
wherein the coordinate system is calibrated to a distance corresponding to an incremental movement of traction components of the AGV when the traction components of the AGV are driven by one or more motors of the AGV;
determining a sequence of incremental movements of the traction components to travel from a starting location to the first waypoint based on the coordinate system, wherein the sequence of incremental movements comprises a pre-determined number of incremental movements of the traction components to reach the first waypoint from the starting location;
executing the sequence of incremental movements to navigate the AGV from the starting location to the first waypoint based on the pre-determined number of incremental movements of the traction components;
receiving information that indicates the AGV is at a first waypoint,
the first waypoint corresponding to a particular item of the one or more items;
activating an optical sensor,
the optical sensor corresponding to the particular item of the one or more items,
wherein activation of the optical sensor is configured to identify the particular item for retrieval;
receiving validation information associated with the particular item,
the validation information received from the AGV;
validating that the particular item has correctly been retrieved based on the validation information; and
updating an inventory database,
the updating configured to reflect a reduced quantity of the particular item is available when the validating indicates the particular item has correctly been retrieved.

11. The non-transitory computer-readable storage medium of claim 10, the operations further comprising transmitting task detail data to a user device,
the task detail data is configured to display one or more tasks to be completed by a user associated with the user device during retrieval of at least the portion of the items on a display screen of the user device.

12. The non-transitory computer-readable storage medium of claim 11, wherein the one or more tasks to be completed are displayed as one or more interactive elements within a graphical user interface,
the graphical user interface providing:
visual information associated with each of the one or more tasks, and
an interactive element configured to solicit input from the user regarding completion of each of the one or more tasks.

13. The non-transitory computer-readable storage medium of claim 12, wherein each of the one or more tasks are displayed according to a color scheme,
the color scheme applies different colors to different tasks of the one or more tasks to indicate a task completion state.

14. The non-transitory computer-readable storage medium of claim 10, wherein traction components of the AGV are driven by a stepper motor,
wherein the coordinate system is calibrated to a distance traveled by the AGV in response to a predetermined number of steps of the stepper motor.

15. The non-transitory computer-readable storage medium of claim 10, wherein the AGV is configured to activate an optical sensor corresponding to a particular bin of the AGV at the first waypoint,
the optical sensor corresponding to the particular bin of the AGV identifying a location where the particular item is to be placed upon retrieval from the item and storage infrastructure.

16. The non-transitory computer-readable storage medium of claim 15, wherein the AGV comprises a sensor configured to determine a weight of the particular item placed in the bin of the AGV,
the validation information including the weight, and
wherein the validating is configured to determine the particular item has correctly been retrieved based on whether the weight indicated in the validation information matches a weight of the particular item.

17. The non-transitory computer-readable storage medium of claim 10, the operations further comprising generating and transmitting an alert to a user device in response to the validating indicating that the particular item has not been correctly retrieved.

18. The non-transitory computer-readable storage medium of claim 10, the operations further comprising:
calculating a series of waypoints associated with retrieval of at least the portion of the one or more items,
the series of waypoints identifying:
one or more locations within the coordinate system where the AGV is to navigate during retrieval of at least the portion of the one or more items, and
a final destination where at least the portion of the one or more items are to be delivered by the AGV after all items included in at least the portion of the one or more items have been correctly retrieved.

19. A system comprising:
an automated guided vehicle (AGV) comprising:
one or more motors;
traction components; and one or more processors; and a memory communicatively coupled to the one or more processors, wherein the one or more processors are configured to:

receive demand information, the demand associated with demand for one or more items utilized by a manufacturing process;

execute a rules engine against the demand information, the execution of the rules engine configured to identify infrastructure from which at least portion of the items utilized by the manufacturing process is to be retrieved, the infrastructure comprising at least AGV and an item and storage infrastructure having a current quantity of at least the portion of the items on hand to meet the demand;

transmit item detail data to the AGV, the item detail data identifies:

one or more items corresponding to at least the portion of the items, a quantity to be retrieved for each of the one or more items, and information identifying a location of each of the one or more items within a coordinate system, wherein the coordinate system comprises units of distance that are calibrated to a distance corresponding to an incremental movement of the traction components of the AGV when the traction components of the AGV are driven by the one or more motors such that the AGV is operable to navigate within the coordinate system by determining a number of incremental movements of the traction components needed to travel from a starting location to a destination location;

receive information that indicates the AGV is at a first waypoint corresponding to a particular item of the one or more items;

activate an optical sensor of the item and storage infrastructure that is disposed proximate a storage location of the particular item of the one or more items, wherein activation of the optical sensor is configured to identify the storage location of the particular item for retrieval;

receive validation information associated with the particular item, the validation information received from the AGV;

validate that the particular item has correctly been retrieved based on validation information; and update an inventory database stored in the memory, the update configured to reflect a reduced quantity of the particular item is available when the validating indicates the particular item has correctly been retrieved.

20. The system of claim 19, wherein the one or more processors are configured to transmit task detail data to a user device, the task detail data configured to display one or more tasks to be completed by a user associated with the user device during retrieval of at least the portion of the items on a display screen of the user device.

\* \* \* \* \*

UNITED STATES PATENT AND TRADEMARK OFFICE
CERTIFICATE OF CORRECTION

| | | |
|---|---|---|
| PATENT NO. | : 11,232,388 B2 | Page 1 of 3 |
| APPLICATION NO. | : 16/692833 | |
| DATED | : January 25, 2022 | |
| INVENTOR(S) | : Paul Sundar Singh et al. | |

It is certified that error appears in the above-identified patent and that said Letters Patent is hereby corrected as shown below:

On the Title Page

Item (54) and in the Specification, Column 1, Line numbers 1-2, delete the Title "AUTOMATED GUIDED VEHICLE SYSTEMS FOR RETRIEVING HEMS" and replace with --AUTOMATED GUIDED VEHICLE SYSTEMS FOR RETRIEVING ITEMS--.

In the Specification

At Column 1, Line number 48, delete "man till taming processes" and replace with --manufacturing processes--.
At Column 1, Line number 61, delete "mechanical anus" and replace with --mechanical arms--.
At Column 2, Line number 39, delete "bettor" and replace with --better--.
At Column 2, Line number 40, delete "faun" and replace with --form--.
At Column 2, Line number 44, delete "designing, other" and replace with --designing other--.
At Column 4, Line number 3, delete "Facilitate" and replace with --facilitate--.
At Column 4, Line number 19, delete "processes maintained or near" and replace with --processes is maintained at or near--.
At Column 4, Line number 31, delete "delivered items" and replace with --delivered. Items--.
At Column 4, Line number 41, delete "fir" and replace with --for--.
At Column 5, staring at Line number 52, delete "manufacturing, process" and replace with --manufacturing process--.
At Column 5, Line number 54, delete "area 180, As" and replace with --area 180. As--.
At Column 7, Line number 13, delete "FIG. 1" and replace with --FIG. 1)--.
At Column 7, Line number 26, delete "AGV s" and replace with --AGVs--.
At Column 7, Line number 29, delete "Store" and replace with --store--.
At Column 8, Line number 17, delete "other for in" and replace with --other form--.
At Column 8, Line number 24, delete "AGV, For" and replace with --AGV. For--.
At Column 8, Line number 34, delete "depending, on" and replace with --depending on--.
At Column 8, Line number 39, delete "AGV is noted" and replace with --AGV. It is noted--.
At Column 8, Line number 62, delete "during, navigation" and replace with --during navigation--.

Signed and Sealed this
Fifth Day of April, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,232,388 B2

At Column 9, Line number 18, delete "data, provided" and replace with --data provided--.
At Column 9, Line number 49, delete "bin, from" and replace with --bin from--.
At Column 9, Line number 55, delete "to be retrieval" and replace with --to be retrieved--.
At Column 9, Line number 60, delete "such, as" and replace with --such as--.
At Column 10, Line number 28, delete "orientation, of" and replace with --orientation of--.
At Column 11, Line number 43, delete "each 8 rotation" and replace with --each 8° rotation--.
At Column 11, Line number 67, delete "daring" and replace with --during--.
At Column 12, Line number 6, delete "an AGVs" and replace with --an AGV--.
At Column 12, Line number 18, delete "etc.), Additionally" and replace with --etc.). Additionally--.
At Column 12, Line number 26, delete "sensors, Additional" and replace with --sensors. Additional--.
At Column 12, Line number 29, delete "FIG. 9, After" and replace with --FIG. 9. After--.
At Column 12, Line number 35, delete "AGV, For" and replace with --AGV. For--.
At Column 12, Line number 50, delete "hut" and replace with --but--.
At Column 13, Line number 1, delete "robotic am" and replace with --robotic arm--.
At Column 13, Line number 25, delete "device 300, In" and replace with --device 300. In--.
At Column 13, Line number 43, delete "State, Software" and replace with --state. Software--.
At Column 13, Line number 58, delete "like Exemplary" and replace with --like. Exemplary--.
At Column 14, Line number 4, add --etc.).-- after "interfaces".
At Column 14, Line number 28, delete "FIG. 120" and replace with --FIG. 12C--.
At Column 14, Line number 52, delete "firms" and replace with --forms--.
At Column 14, Line number 65, delete "inventor" and replace with --inventory)--.
At Column 15, Line number 61, delete "deer merited" and replace with --decremented--.
At Column 16, Line number 40, delete "$Z_5$" and replace with --$Z_6$--.
At Column 16, Line number 63, delete "docking, stations" and replace with --docking stations--.
At Column 17, Line number 9, delete "above, Upon" and replace with --above. Upon--.
At Column 17, Line number 33, delete "identifying, items" and replace with --identifying items--.
At Column 17, Line number 38, delete "140" and replace --440--.
At Column 17, Line number 62, delete "reached, At" and replace with --reached. At--.
At Column 17, Line number 65, delete "reached, At" and replace with --reached. At--.
At Column 18, Line number 10, delete "relieving" and replace with --retrieving--.
At Column 18, Line number 30, delete "leaning" and replace with --learning--.
At Column 18, Line number 31, delete "AGA/" and replace with --AGV--.
At Column 18, Line number 38, delete "rosy" and replace with --may--.
At Column 18, Line number 44, delete "role" and replace with --rule--.
At Column 19, Line number 23, delete "AG Vs" and replace with --AGVs--.
At Column 19, Line number 43, delete "FIG.6, in" and replace with --FIG. 6. In--.
At Column 19, Line number 52, delete "AGVs" and replace with --AGV's--.
At Column 20, Line number 6, delete "650" and replace with --660--.
At Column 20, Line number 67, delete "bin 734, if" and replace with --bin 734. If--.
At Column 21, Line number 30, delete "AGVs" and replace with --AGV--.
At Column 21, Line number 38, delete "AGV is may include" and replace with --AGVs may include--.
At Column 21, Line number 44, delete "AGVs" and replace with --AGV's--.
At Column 21, Line number 50, delete "Such" and replace with --such--.
At Column 21, Line number 53, delete "FIG. to" and replace with --FIG. 1) to--.
At Column 22, Line number 8, delete "item 921, As" and replace with --item 921. As--.

At Column 22, Line number 24, delete "FIG. 1, Additionally" and replace with --FIG. 1. Additionally--.
At Column 22, Line number 33, delete "device, After" and replace with --device. After--.
At Column 22, Line number 39, delete "FIG. 1, Upon" and replace with --FIG. 1. Upon--.
At Column 23, Line number 8, delete "AGV 200, For" and replace with --AGV 200. For--.
At Column 23, Line number 13, delete "bin, in" and replace with --bin. In--.
At Column 23, Line number 32, delete "here" and replace with --where--.
At Column 23, Line number 37, delete "reference to FIG. As" and replace with --reference to FIG. 7. As--.
At Column 23, Line number 41, delete "success ally" and replace with --successfully--.
At Column 23, Line number 45, delete "items, Once" and replace with --items. Once--.
At Column 24, Line number 55, delete "AGA" and replace with --AGV--.
At Column 25, Line number 11, delete "minimizes, the" and replace with --minimizes the--.
At Column 25, Line number 28, delete "Sensor" and replace with --sensor--.
At Column 25, Line number 40, delete "AGA/" and replace with --AGV--.
At Column 26, Line number 17, delete "of, at" and replace with --of at--.